US012739745B2

(12) United States Patent
. et al.

(10) Patent No.: US 12,739,745 B2
(45) Date of Patent: Sep. 15, 2026

(54) METHOD AND APPARATUS FOR CELL MEASUREMENT IN NON-TERRESTRIAL NETWORK COMMUNICATION SYSTEM

(71) Applicant: Samsung Electronics Co., Ltd., Suwon-si (KR)

(72) Inventors: Nishant ., Bangalore (IN); Amit Anandrao Dange, Bangalore (IN); Vivek Murugaian, Bangalore (IN); Kailash Kumar Jha, Bangalore (IN); Mohammad Umair, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 276 days.

(21) Appl. No.: 18/436,867

(22) Filed: Feb. 8, 2024

(65) Prior Publication Data

US 2024/0276363 A1 Aug. 15, 2024

Related U.S. Application Data

(63) Continuation of application No. PCT/KR2024/001547, filed on Feb. 1, 2024.

(30) Foreign Application Priority Data

Feb. 13, 2023 (IN) ............................ 202341009501
Nov. 16, 2023 (IN) ............................ 202341009501

(51) Int. Cl.
*H04W 48/20* (2009.01)
*H04W 64/00* (2009.01)
*H04W 84/06* (2009.01)

(52) U.S. Cl.
CPC ......... *H04W 48/20* (2013.01); *H04W 64/006* (2013.01); *H04W 84/06* (2013.01)

(58) Field of Classification Search
CPC ... H04W 48/20; H04W 64/006; H04W 84/06; H04B 17/318; H04B 17/328; H04B 17/382

(Continued)

(56) References Cited

U.S. PATENT DOCUMENTS

2020/0374719 A1 11/2020 Wang et al.
2021/0227490 A1 7/2021 Yiu (Continued)

FOREIGN PATENT DOCUMENTS

DE 102020121330 2/2021
WO 2020/231123 11/2020

(Continued)

OTHER PUBLICATIONS

Extended European Search Report dated Oct. 22, 2025 issued in European Patent Application No. 24757084.9.

(Continued)

*Primary Examiner* — Juan A Torres
(74) *Attorney, Agent, or Firm* — NIXON & VANDERHYE P.C.

(57) ABSTRACT

A method for cell measurement by a user equipment (UE) in a non-terrestrial network (NTN) communication system is provided. The method includes camping to an NTN cell; receiving at least one parameter from the camped NTN cell; determining a rate of change (ROC) of signal strength of the camped NTN cell; determining whether a neighbor cell measurement criterion is met based on the at least one parameter and the ROC of the signal strength of the camped NTN cell; and initiating measurement for at least one neighbor cell based on the neighbor cell measurement criterion being met.

20 Claims, 13 Drawing Sheets

(58) Field of Classification Search
USPC .................................. 455/437, 436; 370/331
See application file for complete search history.

(56) References Cited

U.S. PATENT DOCUMENTS

| | | | |
|---|---|---|---|
| 2021/0271709 A1 | 9/2021 | Kazem et al. | |
| 2022/0116844 A1 | 4/2022 | Qiao et al. | |
| 2022/0167221 A1 | 5/2022 | Lee | |
| 2022/0252736 A1* | 8/2022 | Fu | G01S 19/256 |
| 2022/0353794 A1 | 11/2022 | Shrestha et al. | |
| 2022/0386200 A1* | 12/2022 | Wang | H04W 36/362 |
| 2023/0209420 A1 | 6/2023 | Xie et al. | |
| 2023/0224791 A1* | 7/2023 | Park | H04W 36/0058 370/331 |
| 2024/0388409 A1* | 11/2024 | Teyeb | H04B 17/318 |
| 2024/0421893 A1* | 12/2024 | Tao | H04B 7/18513 |
| 2025/0142431 A1* | 5/2025 | Lee | H04W 36/0072 |
| 2025/0175942 A1* | 5/2025 | Lee | H04W 36/08 |
| 2025/0240687 A1* | 7/2025 | Liberg | H04W 36/0061 |

FOREIGN PATENT DOCUMENTS

| | | |
|---|---|---|
| WO | 2022/042532 | 3/2022 |
| WO | 2022/151259 | 7/2022 |
| WO | 2022151186 A1 | 7/2022 |
| WO | 2022/208475 | 10/2022 |
| WO | 2022208475 A1 | 10/2022 |

OTHER PUBLICATIONS

3GPP TS 38.304 V17.3.0, "User Equipment (UE) procedures in Idle mode and RRC; Inactive state(Release 17)", Jan. 17, 2023, 51 pages.

Search Report and Written Opinion dated May 8, 2024 issued in International Patent Application No. PCT/KR2024/001547.

Transsion Holdings, 3GPP TSG-RAN WG2, "Discussion on enhancements for neighbour cell measurements", Meeting Notes, Meeting #120, Nov. 14-18, 2022, 4 pages.

Intel Corporation, 3GPP TSG-RAN WG2, "Discussion on NTN cell reselection enhancements", Meeting Notes, Meeting #119, Oct. 10-19, 2022, 7 pages.

Samsung, 3GPP TSG-RAN WG2, "Discussion on NR NTN Cell Reselection Enhancement", Meeting Notes, Meeting #120, Nov. 14-18, 2022, 6 pages.

Oanyong Lee, "Non-Terrestrial Networks (NTN): Enabling Wireless Communication Between Satellites and Mobile", Feb. 28, 2022, 6 pages.

Office Action for IN Application No. 202341009501 dated Mar. 30, 2026, 11 pages.

3GPP TS 38.304, Version 11/00, Release 17, "5G; NR; User Equipment (UE) procedures in idle mode and in RRC nactive state" ETSI TS 138 304 V17.0.0, May 31, 2022, 52 pages.

* cited by examiner

METHOD AND APPARATUS FOR CELL MEASUREMENT IN NON-TERRESTRIAL NETWORK COMMUNICATION SYSTEM

CROSS-REFERENCE TO RELATED APPLICATIONS

This application is a continuation of International Application No. PCT/KR2024/001547 designating the United States, filed on Feb. 1, 2024, in the Korean Intellectual Property Receiving Office and claiming priority to Indian Provisional Patent Application No. 202341009501, filed on Feb. 13, 2023, and to Indian Complete Patent Application No. 202341009501, filed on Nov. 16, 2023, in the Indian Patent Office, the disclosures of each of which are incorporated by reference herein in their entireties.

BACKGROUND

Field

The disclosure relates to wireless networks. For example, the present disclosure relates to cell measurement in Non-Terrestrial Network (NTN) connection.

Description of Related Art

In general, $5^{th}$-generation (5G) network services or terrestrial network can transfer data with faster connectivity speed, low latency and greater bandwidth. The 5G network services can sometimes fail to provide services to certain locations working in terrestrial network. The certain location can be weak signal strength areas, out-of-range areas such as islands, hill stations, remote areas (forest or dessert) and the like. To address service failure problem, a Non-Terrestrial Network (NTN) feature is introduced for communicating directly between a User Equipment (UE) and the NTN such as satellites.

The terrestrial network provides various type of communication services, including voice, data, and video transmission, to users over relatively short distances. In the terrestrial network, near-far effect allows a base station (e.g., gNB) to identify the location of the UE. The UE near the base station can have a relatively high received signal strength and quality (e.g., RSRP/RSRQ/SINR measured by UE is relatively high), whereas the UE that is distant from the base station can have a relatively low received signal strength. The non-terrestrial network provides wireless communication resources and services. The NTN systems can be deployed in two ways—Earth fixed and Earth Moving deployments. As per $3^{rd}$ Generation Partnership Project (3GPP), the NTN cells include a timer associated with the UE to provide the NTN service. The UE can fail to identify an edge of the serving cell with in the time and may not perform cell reselection with in time when the UE reaches the edge of the serving cell when measurement is not started at appropriate time. As a result, the UE will lose the NTN service. Thus, existing methods of cell selection and reselection are not entirely adequate for performing cell selection or reselection in the NTN systems. Therefore, there is a need for a method to determine the optimal time to start cell reselection measurements.

SUMMARY

Embodiments of the disclosure may provide a method for optimization of cell measurement in non-terrestrial network connection. The UE contemplate t-service time remaining, distance covered by the UE in serving cell, ephemeris information of the NTN cell, UE direction vector to evaluate the optimized time to start cell reselection measurement.

Embodiments of the disclosure may provide a rate of change in signal strength of the UE with respect to time remaining, ephemeris information of the NTN cell, the UE direction vector decides on performing cell reselection measurement.

Embodiments of the disclosure may provide the rate of change of signal strength of the UE with respect to time and distance covered, ephemeris information of NTN cell, UE direction vector to decide on performing cell reselection measurement.

Embodiments of the disclosure may optimize the efficiency of measuring intra-frequency, inter-frequency, or inter-RAT prior to t-service. The embodiments may allow the UE that promptly switch to a superior cell when there is a swift alteration in signal strength concerning time or distance, thus circumventing the possibility of the device becoming inoperative before t-service time.

Embodiments of the disclosure may optimize exact time to for measuring intra-frequency, inter-frequency, or inter-RAT, prior to t-service. Embodiments of the disclosure may utilize the rate of change with respect to time distance, in conjunction with ephemeris information. Embodiments of the disclosure may optimize power usage and elevate the performance of devices through the elimination of unnecessary measurements. Accordingly, embodiments of the disclosure may provide a heightened battery experience, and improved coverage. Embodiments of the disclosure may provide preservation of device power and enhances NTN connectivity experience.

Accordingly, an example embodiment herein may provide a method for cell measurement by a user equipment (UE) in a non-terrestrial network (NTN) communication system. The method may comprise camping to an NTN cell. The method may comprise receiving at least one parameter from the camped NTN cell. The method may comprise determining a rate of change (ROC) of signal strength of the camped NTN cell. The method may comprise determining whether a neighbor cell measurement criterion is met based on the at least one parameter and the ROC of the signal strength of the camped NTN cell. The method may comprise initiating measurement for at least one neighbor cell when the neighbor cell measurement criterion is met.

The method may comprise starting a timer related to a service of the NTN cell based camping to the NTN cell. The measurement for at least one neighbor cell may be initiated at a time for completing a cell reselection before an expiry of the timer.

Initiating the measurement for the at least one neighbor cell may comprise determining whether at least one of remaining time of the service fot the NTN cell is less than a specified threshold, a ROC criterion is met, a direction of the camped NTN cell intersecting with direction of the UE.

The method may comprise determining whether a remaining duration of the timer is sufficient for subsequent neighbor cell measurement and the time to start measurement based on a discontinuous reception, DRX, cycle received from the camped NTN cell, a scaling factor of the camped NTN cell, and a SS/PBCH block measurement timing configuration, SMTC, period of the camped NTN cell.

The method may comprise continuing communication with the camped NTN cell, when the neighbor cell measurement criterion is not met.

The at least one parameter may comprise at least one of an ephemeris information of the camped NTN cell, a distance of the UE from an NTN reference location on earth, and a duration of the t-service timer received from NTN cell.

The method may comprise measuring the ROC of the signal strength for a specified time period. The method may comprise determining whether an average ROC of the signal strength is greater than a threshold value based on the measured ROC for the specified time period. The method may comprise performing one of: determining an instantaneous ROC of the signal strength based on determined average ROC of the signal strength, and wherein based on the ROC of a reference signal received power (RSRP) value exponentially degrading within duration of the timer, initiating the at least one neighbor cell measurement; or continuing the measurement of the ROC of the signal strength for a specified time period, based on the ROC of the RSRP value being constant within duration of the timer.

Initiating the measurement for the at least one neighbor cell may comprise determining a direction of the UE; and determining a time to initiate the measurement for the at least one neighbor cell based on the direction of the UE and a trajectory of the NTN cell.

Initiating the measurement for the at least one neighbor cell may comprises initiating the measurement at the time such that a cell reselection is completed before the expiry of the timer.

Determining the time to initiate the measurement for the at least one neighbor cell may comprise initiating at least any one of intra-frequency, inter-frequency, and inter radio access technology (RAT) measurement to reselect a cell, when a neighbor cell measurement criteria is met; and determining the ROC of the signal strength of the camped NTN cell to initiate the at least one neighbor cell measurement, based on ROC criteria being met or the remaining t-service timer being less than the specified threshold.

Accordingly, an example embodiment herein provides a user equipment (UE) for cell measurement in a non-terrestrial Network (NTN) connection. The UE may comprise a memory storing instructions, and at least one processor. The at least one processor is configured to, when executing the instructions, cause the UE to perform operations. The operations may comprise receiving at least one parameter from the camped NTN cell. The operations may comprise determining a rate of change (ROC) of signal strength of the camped NTN cell. The operations may comprise determining whether a neighbor cell measurement criterion is met based on the at least one parameter and the ROC of the signal strength of the camped NTN cell. The operations may comprise initiating measurement for at least one neighbor cell when the neighbor cell measurement criterion is met.

Accordingly, an example embodiment herein provides a non-transitory computer-readable storage medium is provided. The non-transitory computer-readable storage medium may store instructions which, when executed by at least one processor of a user equipment (UE) cause the UE to perform operations. The operations may comprise receiving at least one parameter from the camped NTN cell. The operations may comprise determining a rate of change (ROC) of signal strength of the camped NTN cell. The operations may comprise determining whether a neighbor cell measurement criterion is met based on the at least one parameter and the ROC of the signal strength of the camped NTN cell. The operations may comprise initiating measurement for at least one neighbor cell when the neighbor cell measurement criterion is met.

These and other aspects of various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure without departing from the spirit thereof, and the embodiments herein include all such modifications.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
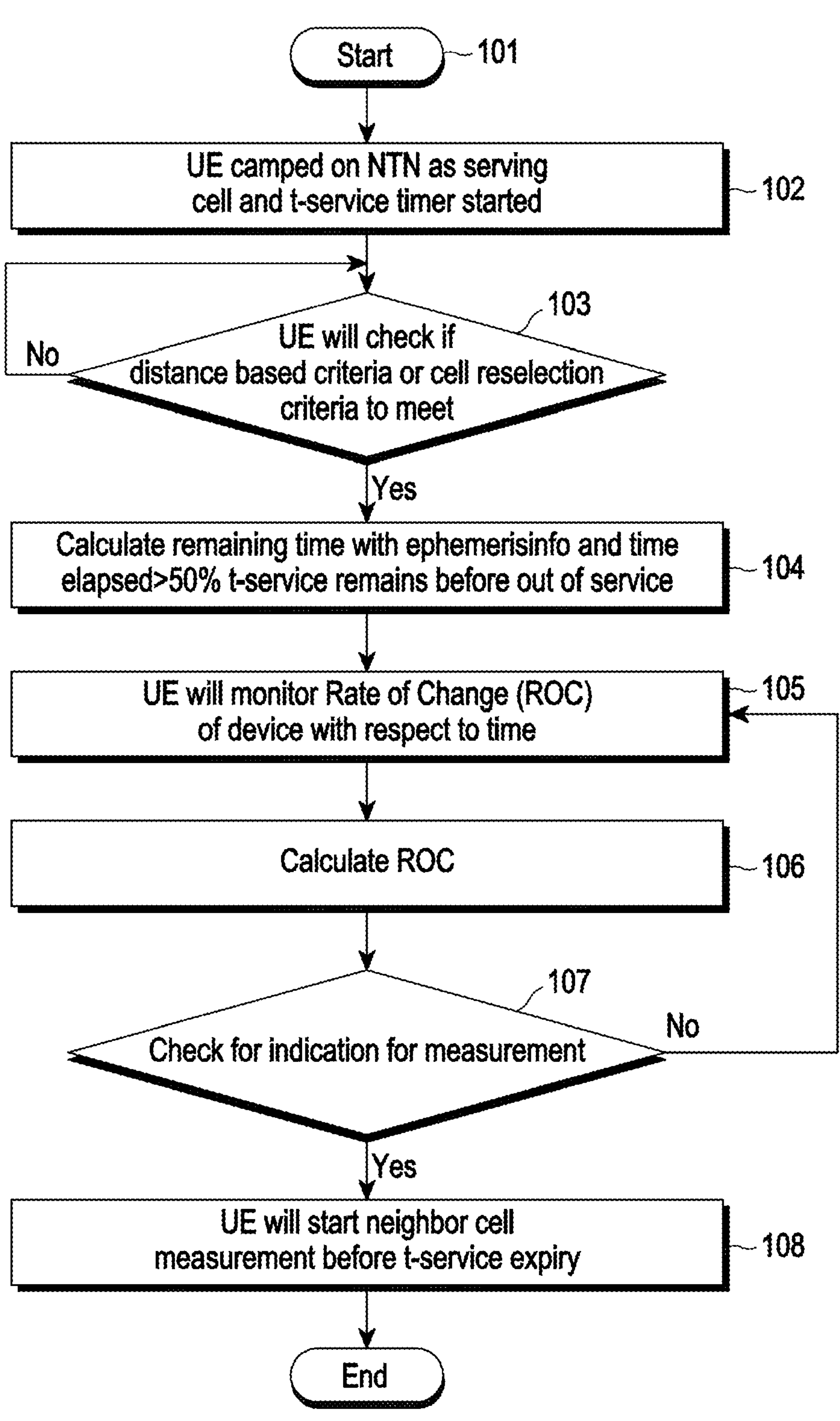
FIG. 1 is a flowchart illustrating an example method of optimization of cell measurement in Non-Terrestrial Network (NTN), according to various embodiments.

The various example embodiments herein and the various features and advantageous details thereof are explained more fully with reference to the accompanying drawings and detailed in the following description. Descriptions of well-known components and processing techniques may be omitted so as to not unnecessarily obscure the disclosure. The various embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the disclosure.

Embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

An existing method for cell selection or reselection in NTN is described. The NTN includes determining cell selection or reselection criteria including relationship between the wireless device and a satellite or spot beam. The existing methods fail to mention or propose precise time to start measurement before t-device using rate of change of time or distance. In other conventional methods, the cell selection or reselection based on ephemeris configuration information is disclosed. A ranking of candidate cells and adjusting the ranking of the candidate cells is disclosed in the existing methods, but fails to disclose the time for the cell measurement in the NTN connection.

In other conventional systems, conditional handover based on the service time of candidate cells in a wireless communication system is disclosed. The indication is provided for tracking area or timing in advance for the cell of the wireless network.

In the and the disclosure, the UE for optimized cell measurement in the NTN connection is disclosed. The UE camps on to the NTN cell to start a time-of-service timer once the UE is camped to the NTN cell. Parameters are received from the camped NTN cell and determining whether the cell reselection criteria is met based on the parameters received from the camped NTN cell. The UE performs one of, initiating at least one neighbor cell measurement before an expiry of the time-of-service timer, when the cell reselection criterion is met or continuing communication with the camped NTN cell, when the cell reselection criterion is not met.

In an embodiment, the UE contemplates t-service time remaining, distance covered by the UE in serving cell, ephemeris information of the NTN cell, UE direction vector to evaluate best optimized time to start cell reselection measurement for neighbor cells/frequencies. The UE using a rate of change in signal strength of device with respect to the time remaining, ephemeris information of the NTN cell, UE direction vector to decide on performing cell reselection measurement. The UE using rate of change in signal strength of device with respect to distance covered, ephemeris information of the NTN cell, UE direction vector to decide on performing the cell reselection measurement.

The disclosure pertains to the initiation of cell measurements by the UE in an NTN network. Pursuant to the 3GPP specification, the UE begins measurement once it meets the existing measurement criteria and distance-based rules. Additionally, the UE performs measurements (intra/inter frequency & inter-RAT) based on the t-service, which determines the exact time to commence measurements before the cell stops serving its current coverage. However, the UE's implementation is key in determining the initiation time. Essentially, when t-service is activated, a UE connected to an NTN cell will commence measurements based on the implementation, to prevent and/or reduce service loss. Nevertheless, various factors may necessitate the UE to initiate measurements earlier to avoid service disruptions or disconnections, and locate a better cell to switch to before losing coverage from the current serving cell. Due to the prevailing conditions, there is a likelihood that the UE may not find an appropriate neighboring cell to switch to, based on the measurement rule, leading to a poor user experience on the NTN cell.

In an embodiment, the disclosed solution is provided with respect to time related issues in which when the UE camps on an NTN cell, it initiates measurements before the cell stops serving its current coverage. These measurements encompass intra-frequency, inter-frequency, and inter-RAT measurements, and occur before the T-service timer ends. However, there is a risk of the UE losing service or selecting a suboptimal cell when the cell measurement starts after the current coverage ends. To address this issue, the disclosed solution includes monitoring the rate change of Reference Signal Received Power (RSRP) over time and the remaining T-service time of the serving cell. If the RSRP value declines rapidly and there is ample T-service time, the UE initiates measurement of neighboring cells to find a more suitable intra/inter-frequency or inter-RAT cell. This allows the UE to acquire service without waiting for the T-service timer to expire, which could result in the loss of service and a prolonged wait for measurement to begin to camp on a suitable cell. Similarly, the UE will prioritize a target cell with the same Tracking Area Code (TAC) broadcasted by the serving cell to reduce signaling. Additionally, the UE takes into account the NTN cell's direction vector to choose an appropriate cell. This solution enables the UE to find a suitable cell early on and avoid service loss, resulting in a better user experience.

In an embodiment, the distance-related issues in which the UE camped on an NTN cell is not required to perform intra-frequency measurements and lower/equal priority measurements for inter-frequency/inter-measurement, if the criteria based on distance threshold are not met. The distance threshold represents a threshold value associated with the distance from a reference location configured with reference Location 1 or reference location 2, where each step represents a distance of 50 meters. With the disclosed solution, the UE will monitor the rate change of RSRP with respect to distance, which is measured with the help of a reference location for the serving cell. If the RSRP value is degrading rapidly and the distance-based rules are not met, the UE will start measuring neighboring cells for intra/inter-frequency and inter-RAT measurement to find a suitable cell. This approach will enable the UE to acquire service without waiting for the distance threshold criteria to be met for measurement, which could result in the loss of service followed by additional waiting time for measurement to start to camp on a suitable cell. With the disclosed solution, the UE is able to identify a suitable cell beforehand and avoid service loss, thereby providing a better user experience.

In an embodiment, TA-related concerns that arise when the UE is required to execute TAU while moving between NTN cells of the small or wide tracking area type are addressed. The former results in a high volume of signalling overhead due to continuous signalling, while the latter leads to a high paging load. In an NTN network, multiple TAC per PLMN can be broadcast in a cell, indicating to the UE that more than one TAC per cell is available. With the disclosed solution, the UE will monitor the TA of the current serving cell and its signal conditions, and select a suitable cell that has the same TAC as one of the TACs reported by the serving cell. This will allow the UE to avoid extensive TAU signalling and perform a soft switch by updating TAU information without additional signalling, resulting in a smooth service acquisition and continued network connection during satellite movement. The disclosed solution enables the UE to pre-emptively identify a suitable cell and avoid service loss and excessive signalling, thereby delivering a superior user experience.

The disclosed solution for the UE surpasses the limitations of conventional systems. It enables the acquisition of the best cell based on the rate of change of RSRP relative to time and distance from the reference location. Furthermore, the UE can smoothly transition to another TA area with a moving cell through soft switching, without incurring excessive signaling overhead. The disclosed solution also takes into consideration the direction vector of the NTN cell/satellite when selecting a target cell. As a result, users can enjoy a seamless 5G service experience and avoid service interruptions and additional signaling. This feature sets the disclosure apart from conventional devices, contributing to a more equalized service in NTN cell.

FIG. 1 is a flowchart illustrating example optimization of cell measurement in Non-Terrestrial Network (NTN), according to various embodiments.

At 101, optimization of cell measurement in NTN cell is started.

At 102, a UE (201) is camped on the NTN as a serving cell or camped cell and the t-service timer is started. The serving cell can be a base station or the NTN with which the UE (201) is communicating and receiving primary signal. When the UE (201) is not actively engaged in a call, data session, or other active communication, the UE (201) remains "camped" on a specific cell or the NTN even though the UE (201) can be actively using the cell for communication. While camped, the UE (201) is connected to the NTN for standby purposes, ensuring the UE (201) is ready to receive incoming calls or data requests without delay.

At 103, the UE (201) checks whether distance-based criteria or cell reselection-based criteria is met. The cell reselection is based on parameters such as but not limited to ephemerisInfo of the camped NTN cell, a distance covered by the camped cell, and duration of the time-of-service timer. The ephemerisInfo can be ephemeris data for calculating precise positions of satellites, and accurate positioning information for Global Navigation Satellite System (GNSS) receivers on the ground. The Ephemeris data can include parameters about the NTN such as: NTN ID, time of transmission of a signal, satellite clock offset of the NTN, orbit parameters of the NTN, Ephemeris reference time of the NTN, Ephemeris validity period and the like.

At 104, remaining time is determined using ephemerisInfo and when the time elapsed is greater than a pre-defined threshold (example 50 percent) of the total time or time-of-service timer. When the UE (201) is camped on to the NTN, the time-of-service timer is started. The UE (201) can consider the time-of-service time remaining, distance covered by the UE (201) in a serving cell, ephemeris information of the NTN cell (202), the UE (201) direction vector and the like. The UE (201) determines optimized time to start the cell reselection measurement.

At 105, the UE (201) monitors Rate of Change (ROC) of signal strength of the UE (201) device with respect to the time. The time is considered as the time of connection of the UE (201) with the NTN cell (202), time remaining for the UE (201) to be in connection with the NTN cell (202), and total time of connection of the UE (201) with the NTN cell (202). At 106 ROC is calculated.

At 107, indication for measurement of a new NTN or a cell is determined. When the UE (201) determines that the measurement is required, then the UE (201) monitor the ROC of the signal strength of the UE (201), else the UE (201) can initiate the neighbor cell measurement before the time-of-service expiry (108).

At 108, the UE (201) initiates the neighbor cell measurement before the time-of-service expiry.

Figure 2:
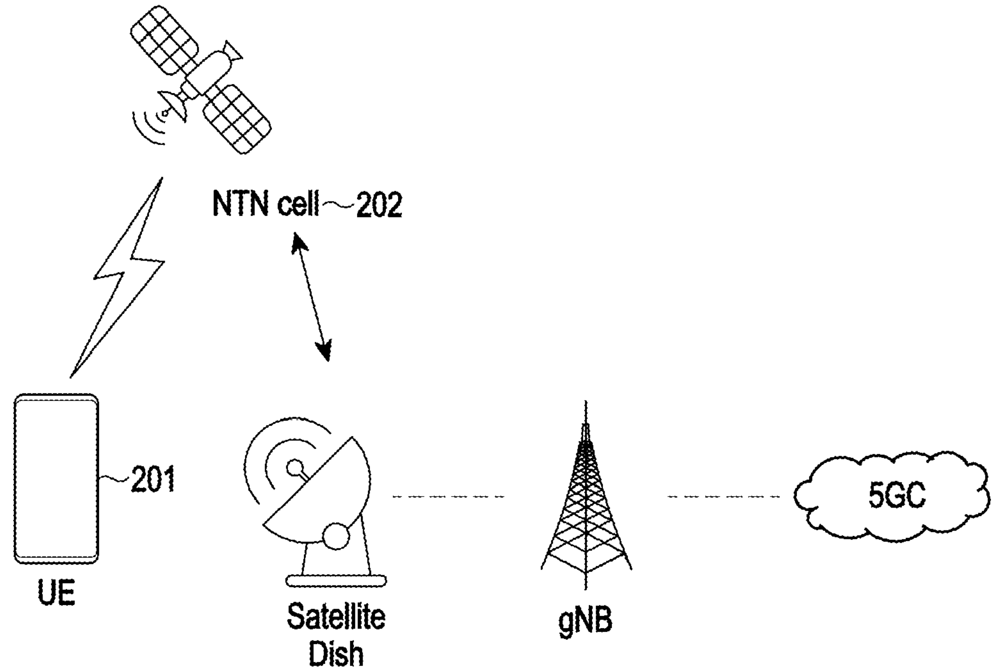
FIG. 2 is a diagram illustrating a network operating through an air/space borne vehicle for communication, according to the prior art.

FIG. 2 is a diagram illustrating network operating of the NTN cell, according to prior art. The NTN use cases are described herein. The NTN services can be segmented into 3 categories such as service continuity, service ubiquity and service scalability. The service continuity maintains the consistent and uninterrupted service availability. In areas where the service is infeasible such as rural areas, desert areas, forest, oceans and the like. The service ubiquity provides services that are universally accessible and available to users regardless of the location or the type of device. The service scalability refers to the network ability to expand or adjust the capacity to accommodate increasing numbers of users, devices, or data traffic without compromising the quality of service.

The existing systems face technical challenges related to the NTN cells (202) such as large delay, large doppler shifts, latency, mobility, antenna performance, and competition etc. The large delay can be due to distance between the UE (201) and the NTN cell (202). The large doppler shift can be due to continuous and fast movement of the NTN cell (202) related to the UE (201) movement. The latency can be due to distance between the UE (201) and the NTN cell (202). When the distance between the UE (201) and the NTN is more than 250-2000 km, the delay is introduced. Due to moving cell, mobility between the NTN to NTN, NTN to TN and vice versa to be considered. The antenna performance needs to be better to communicate with the NTN and handle mobility.

```
-- ASN1START
-- TAG-SIB19-START
SIB19-r17 ::= SEQUENCE {
  ntn-Config-r17                  NTN-Config-r17                  OPTIONAL,   -- Need R
  t-Service-r17                   INTEGER (0..549755813887)       OPTIONAL,   -- Need R
  referenceLocation-r17           ReferenceLocation-r17           OPTIONAL,   -- Need R
  distanceThresh-r17              INTEGER(0..65525)               OPTIONAL,   -- Need R
  ntn-NeighCellConfigList-r17     NTN-NeighCellConfigList-r17     OPTIONAL,   -- Need R
  lateNonCriticalExtension        OCTET STRING                    OPTIONAL,
  ...,
  [[
  ntn-NeighCellConfigListExt-v1720     NTN-NeighCellConfigList-r17     OPTIONAL    -- Need R
  ]]
}
NTN-NeighCellConfigList-r17 ::=     SEQUENCE (SIZE(1..maxCellNTN-r17)) OF NTN-NeighCellConfig-r17
NTN-NeighCellConfig-r17 ::=         SEQUENCE {
  ntn-Config-r17                  NTN-Config-r17                  OPTIONAL,   -- Need R
  carrierFreq-r17                 ARFCN-ValueNR                   OPTIONAL,   -- Need R
  physCellId-r17                  PhysCellId                      OPTIONAL    -- Need R
}
-- TAG-SIB19-STOP
-- ASN1STOP
NTN-Config-r17 ::=                SEQUENCE {
  epochTime-r17                   EpochTime-r17                   OPTIONAL, -- Need R
  ntn-UlSyncValidityDuration-r17 ENUMERATED{s5, s10, s15, s20, s25, s30, s35,s40, s45, s50, s55, s60, s120, s180, s240, s900}
                                                                  OPTIONAL, -- Cond SIB19
  cellSpecificKoffset-r17         INTEGER(1..1023)                OPTIONAL, -- Need R
  kmac-r17                        INTEGER(1..512)                 OPTIONAL, -- Need R
  ta-Info-r17                     TA-Info-r17                     OPTIONAL, -- Need R
  ntn-PolarizationDL-r17          ENUMERATED {rhcp,lhcp,linear}   OPTIONAL, -- Need R
  ntn-PolarizationUL-r17          ENUMERATED {rhcp,lhcp,linear}   OPTIONAL, -- Need R
  ephemerisInfo-r17               EphemerisInfo-r17               OPTIONAL, -- Need R
  ta-Report-r17                   ENUMERATED {enabled}            OPTIONAL, -- Need R
  ...
}
EpochTime-r17 ::=                 SEQUENCE {
  sfn-r17                         INTEGER(0..1023),
  subFrameNR-r17                  INTEGER(0..9)
}
TA-Info-r17 ::=                   SEQUENCE {
  ta-Common-r17                   INTEGER(0..66485757),
  ta-CommonDrift-r17              INTEGER(−257303..257303)        OPTIONAL, -- Need R
  ta-CommonDriftVariant-r17       INTEGER(0..28949)               OPTIONAL -- Need R
}
```

Figure 3:
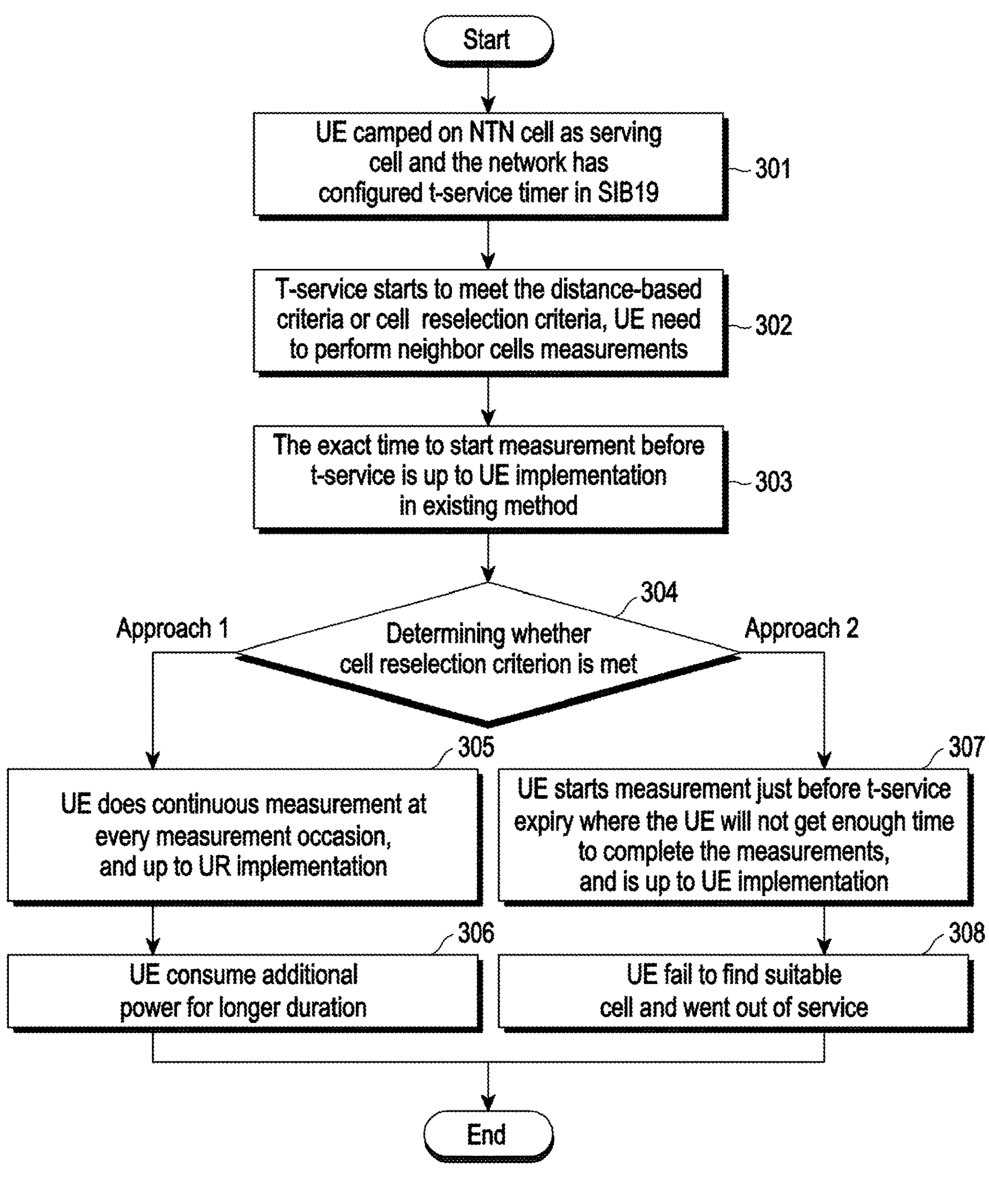
FIG. 3 is a flowchart illustrating the UE camped on NTN cell, according to the prior art.

FIG. 3 is a flowchart illustrating the UE (201) camped on the NTN cell (202), according to the prior art.

At step 301, the UE (201) is camped on the NTN cell (202) as the serving cell. The time-of-service timer is configured in System Information Block Type (SIB19).

At step 302, the time-of-service timer is started. The distance-based criteria or cell-based criteria is determined for the UE (201) camped on the NTN. The UE (201) performs the neighbor cell measurements based on the distance-based criteria or cell-based criteria.

At step 303, the time to start measurement before the time-of-service timer is decided by the UE (201) in the existing methods. The time-of-service timer can be started when the user is camped on the serving cell.

At step 304, the cell reselection criteria are determined. When the cell reselection criterion in met, then the step 305 is performed.

At step 305, the UE (201) measures whether the cell reselection criteria is met. When the cell reselection criterion is met, then 305 is performed, else 307 is performed. As per the conventional methods, there can be two approaches such as first approach and second approach.

At step 305, the UE (201) continuous measurement at every measurement occasion and up to UE implementation. When the UE (201) measures the neighboring cell at every measurement occasion, then the UE (201) consumes additional power for longer duration (306).

At step 306, the UE (201) starts to measure immediately before t-service expiry and the UE (201) do not get enough time to complete the measurement of the neighbor cell and initiating the measurement is up to the UE (201). When the UE (201) starts the neighbor cell measurement before the time-of-service expiry, then the UE (201) can fail to determine suitable cell and get out of service at step 308.

The UE (201) is camped on the NTN cell (202). The UE (201) includes System Information Block Type (SIB19) and t-service timer is started. The SIBs broadcast essential network-related information to user devices (e.g., smartphones, tablets) in the coverage area. The SIBs play a crucial role in the functioning and optimization of the wireless network.

The cell measurement includes measurement of intra-frequency, inter-frequency and inter-RAT before t-service. The UE (201) checks distance between the UE (201) and the serving cell reference location or whether the serving cell fulfils Srxlev>$S_{IntraSearchP}$ and Squal>$S_{IntraSearchQ}$, or Srxlev>$S_{nonIntraSearchP}$ and Squal>$S_{nonIntraSearchQ}$. The Srxlev parameter represents minimum received signal level required for the UE (201) to consider a cell eligible for connection or reselection. A higher Srxlev value indicates a stronger signal requirement for the cell to be considered for connection or reselection. The $S_{IntraSearchP}$ parameters are thresholds used for intra-frequency cell reselection, which may refer, for example, to the reselection of cells within the same frequency band. The $S_{IntraSearchP}$ represents the threshold for signal strength (in dBm), and Squal represents the threshold for signal quality (in dB). The Signal quality is usually related to the signal-to-noise ratio (SNR) or the received signal's quality. The $S_{IntraSearchQ}$ parameter is another threshold for intra-frequency cell reselection but specifically applies to the quality criterion. The parameter helps the user device decide whether to perform an intra-frequency cell reselection based on the quality of the current serving cell compared to neighboring cells within the same frequency band. The $S_{nonIntraSearchP}$ parameter are similar to SIntraSearchP and SIntraSearchQ but are used for non-intra frequency cell reselection. The non-intra frequency cell reselection involves selecting cells in a different frequency band. When the UE detects that the signal quality or strength of the current serving cell is not sufficient, and the UE (201) needs to search for a better cell in a different frequency band.

When the criteria are met then the UE (201) start the measurement but when the criteria not met, the conventional method do not describe exact time to start measurement before t-service.

The UE (201) starts measurement early consuming power or the UE (201) start measurement late leading to out of service. So with the conventional method, the UE (201) fails to find suitable cell to switch and the user experience poor quality on the NTN cell (202).

The ephemerisInfo provides NTN ephemeris either in format of position and velocity state vector or in format of orbital parameters.

When the time-of-service of the serving cell is present in SIB19, and when the UE (201) supports time-based measurement initiation, the UE (201) performs intra-frequency, inter-frequency or inter-RAT measurements before the time-of-service, regardless of the distance between the UE (201) and the serving cell reference location or whether the serving cell fulfils Srxlev>SIntraSearchP and Squal>SIntraSearchQ, or Srxlev>SnonIntraSearchP and Squal>SnonIntraSearchQ, The exact time to start measurement before time of service is up to the UE (201) implementation. The UE (201) perform measurements of higher priority NR inter-frequency or inter-RAT frequencies regardless of the remaining service time of the serving cell (that is time remaining until time of service).

When evaluating the distance between the UE (201) and the serving cell reference location, the UE (201) decides whether to obtain the UE (201) location information.

The UE (201) measures the SS-RSRP and SS-RSRQ level of the serving cell and evaluate the cell selection criterion S for the serving cell at least once every M1*N1 DRX cycle; where:

M1=2 if SMTC periodicity ($T_{SMTC}$)>20 ms and DRX cycle≤0.64 second and $N_{SMTC}$=1, upon one SMTC configured at the UE (201), M1=2.5 if SMTC periodicity ($T_{SMTC}$)>20 ms and DRX cycle≤0.64 second and 1<$N_{SMTC}$≤4, otherwise M1=1.

Where, NSMTC is the number of SMTCs configured by SAN.

| DRX cycle length [s] | Scaling Factor (N1) FR1 | $N_{serv}$ [number of DRX cycles] |
|---|---|---|
| 0.32 | 1 | M1*N1*4 |
| 0.64 | | M1*N1*4 |

-continued

| DRX cycle length [s] | Scaling Factor (N1) FR1 | $N_{serv}$ [number of DRX cycles] |
|---|---|---|
| 1.28 | | N1*2 |
| 2.56 | | N1*2 |

Note 1:
The UE is not required to meet the requirements for 2.56 s DRX cycle length for earth-moving LEO deployment.

Figure 4:
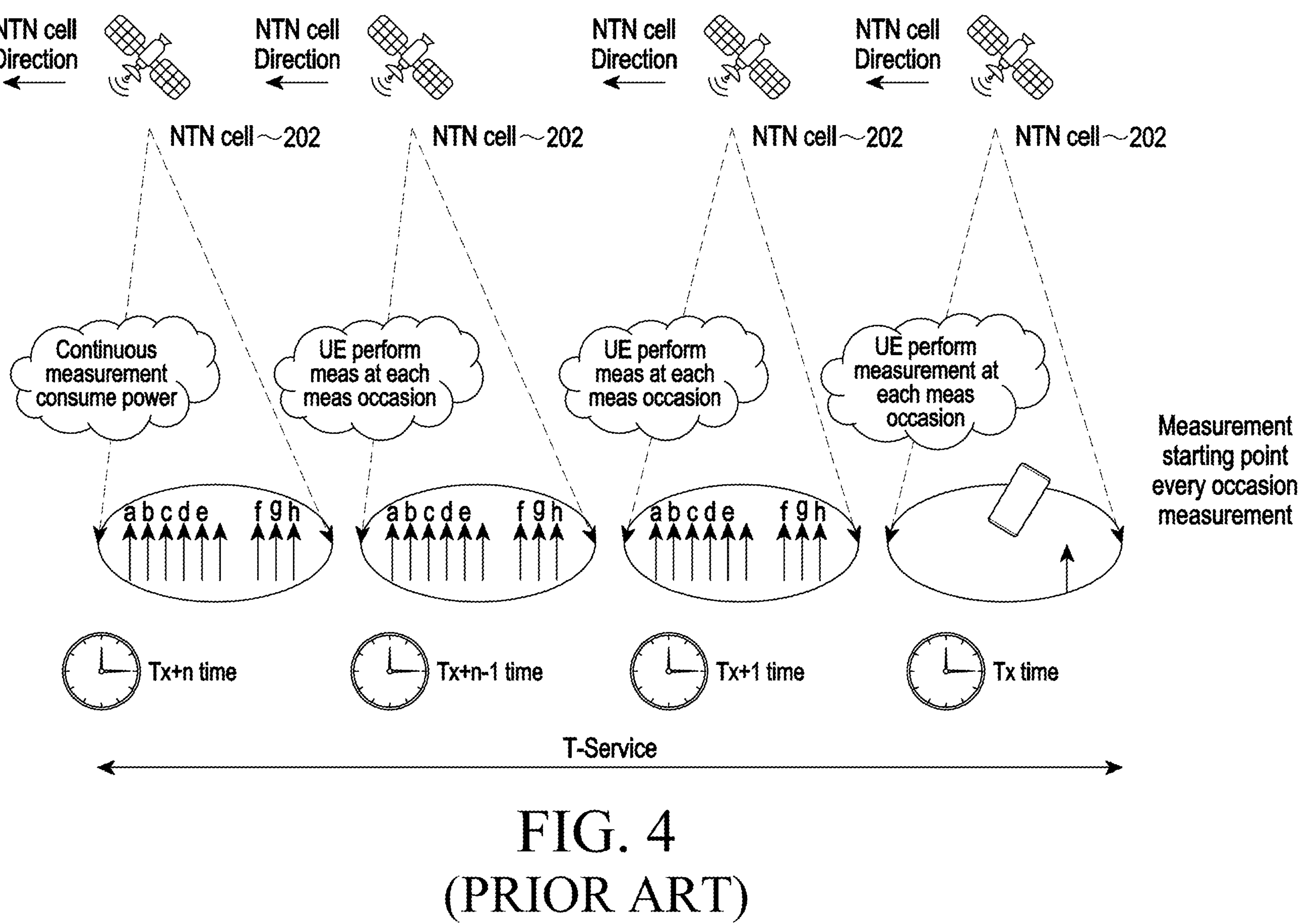
FIG. 4 is a diagram illustrating a continuous measurement of distance between UE and the serving cell reference location for t-service timer, according to the prior art.

FIG. 4 is a diagram illustrating a continuous measurement from start of t-Service, according to the prior art. The schematic includes the NTN cell (202), the UE (201).

Along with above services, one of the main purposes of the 5G network is to provide larger coverage to the user even in remote area such as forest, island, desert or on ship or airplane where terrestrial network not able to provide coverage or deployment cost is very high. The NTN features are introduced for a larger coverage and resilience compared to terrestrial networks. The NTN refers to networks operating through an air/space borne vehicle for communication. While the UE (201) camped on the NTN network, the UE (201) perform intra-frequency, inter-frequency or inter-RAT measurements before the time of service or the measurement can start when distance-based measurement criteria met.

When distance-based criteria are not met, the UE (201) perform frequency measurement before time-of-service expiry. When the UE (201) fail to start or complete measurement before time-of-service, the UE (201) can go out of service as no suitable cell measurement perform for cell reselection and UE (201) remain in current cell till the time-of-service expiry. The disclosed method performs measurement decision based on parameters available and avoid loss of service or bad user experience.

Referring to FIG. 4, the UE (201) is camped on the NTN cell (202). The direction of the NTN cell (202) is shown in FIG. 4. The UE (201) continuous measurement once camped to the NTN cell (202). The arrows (a, b, c, d, e, f, g, h . . . ) represents the periodic measurements performed by the UE (201) to evaluate neighbor cells for the cell reselection. The NTN cell (202) position is represented by time, Tx+n, Tx+n−1, Tx+1, Tx. The UE (201) initiates the cell measurement periodically at each measurement occasion at a, b, c, d, e, f, g, h . . . while the NTN cell (202) keeps moving with time Tx+n−1, Tx+1, Tx and so on.

Figure 5:
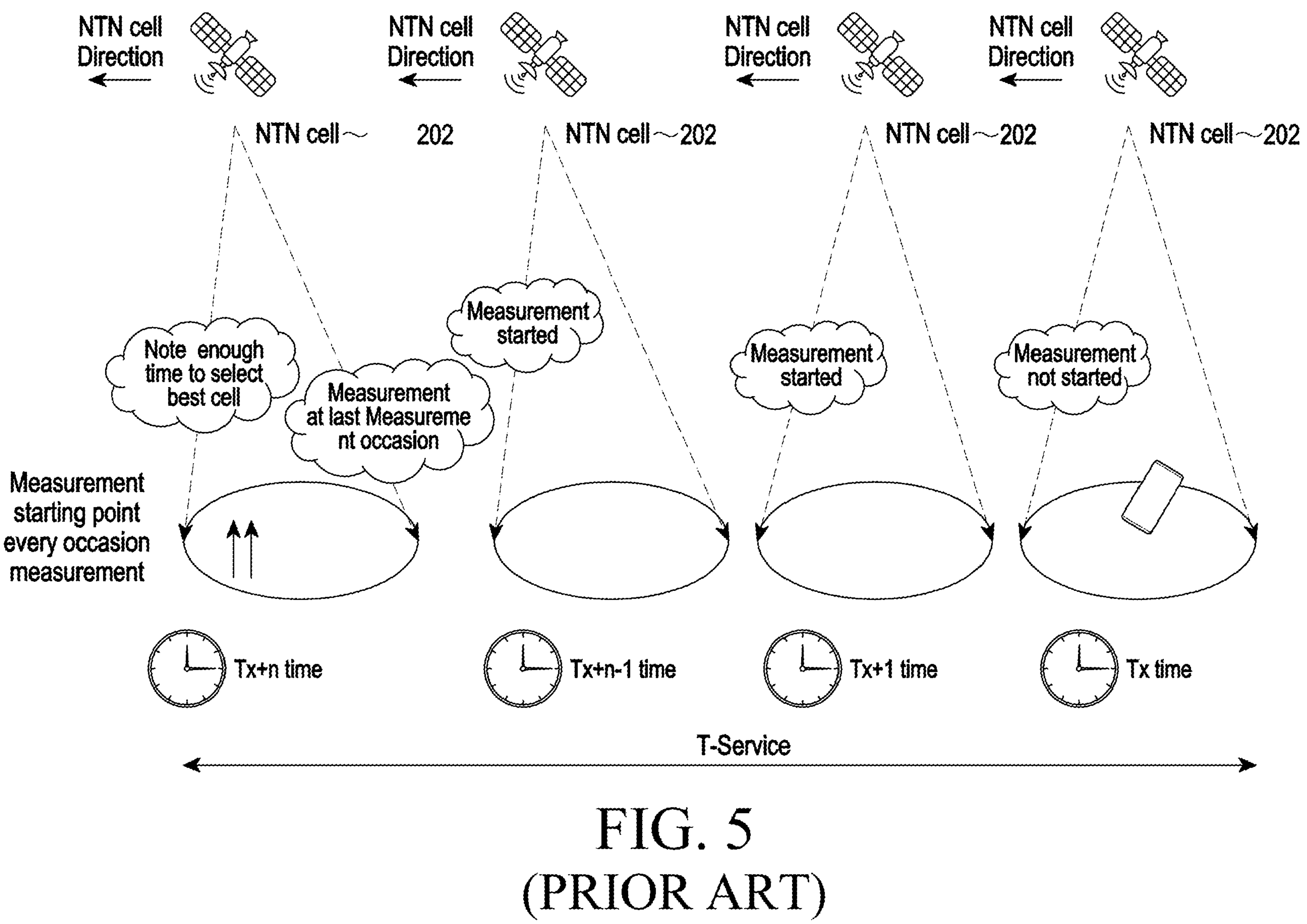
FIG. 5 is a diagram illustrating a measurement of the NTN cell at final measurement occasion before t-service expiry, according to the prior art.

FIG. 5 is a diagram illustrating a measurement of the NTN cell at final measurement occasion before t-service expiry, according to the prior art. Referring to FIG. 5, at Tx time the NTN cell (202) is connected to the UE (201). The UE is in idle position and the cell measurement is not initialized. The starting point is a time when the user is recently camped to the NTN cell (202). At time Tx+1, the UE (201) is still in idle state and the NTN cell (202) is moving in a predefined direction as shown in Tx_1 time and Tx+n−1 time. The UE (201) initiates the cell measurement at final time (that is Tx+n) of the NTN cell (202) camping and fails to initialize the cell reselection when the UE (201) is about to go out of service. In the conventional method, the UE (201) initiated the cell reselection at the initial stage or at the final stage and when the UE (201) reaches the Tx time, the UE (201) may fail to discover the new neighbor cell as the UE (201) fails to select the best cell before the expiry time. The expiry time can be the time when the UE (201) is camped on the NTN cell (202) and the time-of-service timer is about to end or reaching the expiry of the time-of-service timer. The Tx time can be represented as the time when the time-of-service is near to expiry.

Figure 6A:
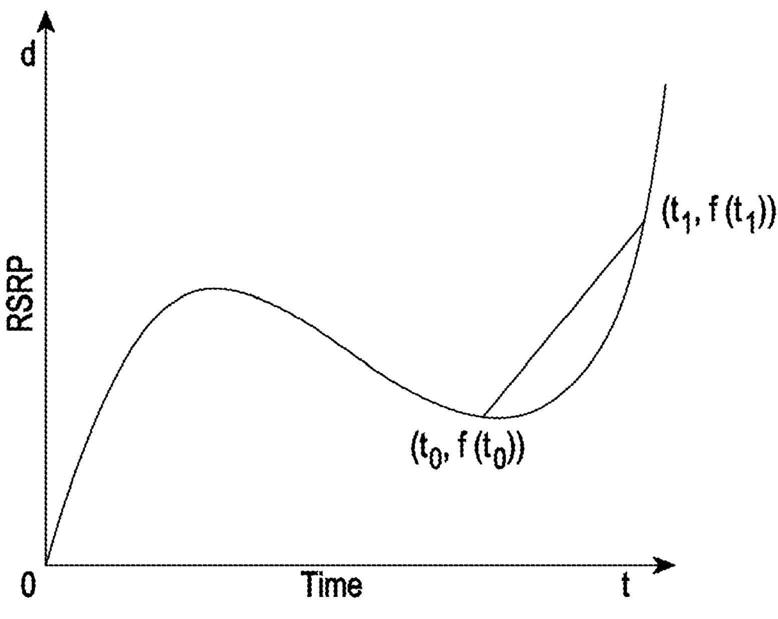
FIG. 6A is a graph illustrating signal strength value measurement of serving cell with respect to time, according to various embodiments.

FIG. 6A is a graph illustrating signal strength value measurement of serving cell with respect to time, according to various embodiments. In the disclosure: the UE (201) camped on the NTN cell (202) and read SIB19 broadcast message to start time-of-service timer and wait for a time to perform cell reselection measurement when required. Regardless of distance-based criteria or cell reselection criteria, the UE (201) starts monitoring signal strength value of serving cell when pre-defined threshold (for example 50%) time-of-service time has elapsed or the pre-defined threshold (for example 50%) of distance covered and direction of the NTN cell (202) based on ephemeris info received as part of NTN-configure in SIB19 intersects with the direction of the UE (201).

The UE (201) monitors signal strength (RSRP/RSRQ/SINR based) of serving cell with sampling rate of X sec to calculate average rate of change (ROC) with equation 1.

Equation (1)

$$\text{Average Rate of Change} = \text{Slope}(m) = \Delta d/\Delta t = \frac{d2-d1}{t2-t1} = \frac{f(t_1)-f(t_0)}{t_1-t_0}$$

When average rate of change (ROC) of device is greater than 1, that is tangent at 45 degrees, indicates signal strength of device not increasing steadily Equation (1).

Figure 6B:
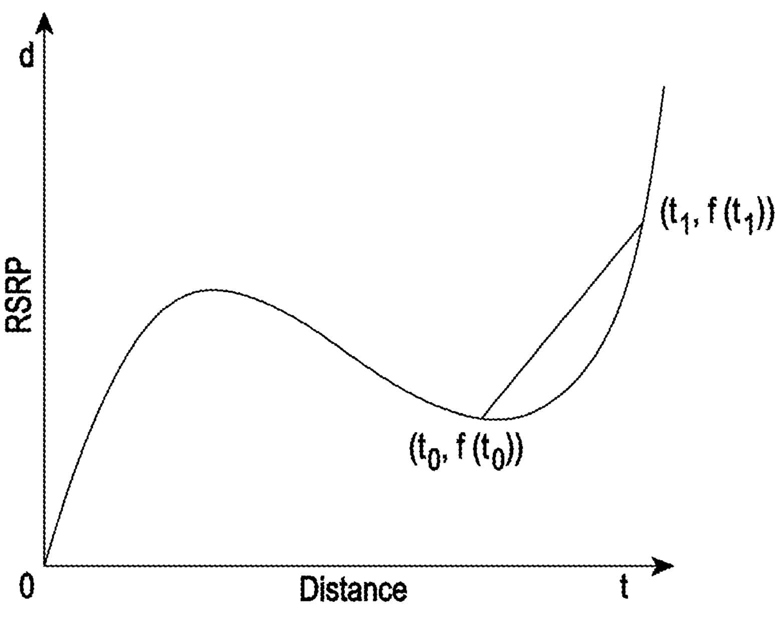
FIG. 6B is a graph illustrating signal strength value measurement of service cell with respect to distance, according to various embodiments.

FIG. 6B is a graph illustrating signal strength value measurement of service cell with respect to distance, according to various embodiments herein. The UE (201) camped on the NTN cell (202) and reads SIB19 broadcast message to start the time-of-service timer. In the distance-based criteria the UE (201) initiates the signal strength value of the serving cell, when the predefined threshold is exceeded (that is for instance 50 percent) for the distance covered and direction of the NTN cell (202) based on the ephemeris information received as part of NTN-configure in SIB19 intersecting with the direction of the UE (201). The average ROC is determined by the UE (201) for initiating the cell reselection.

When the average ROC of the UE (201) is greater than 1, as shown in FIG. 6B, then the ROC is rapid. The UE (201) initiates the cell reselection measurement, when the average is greater than 1.

Figure 7A:
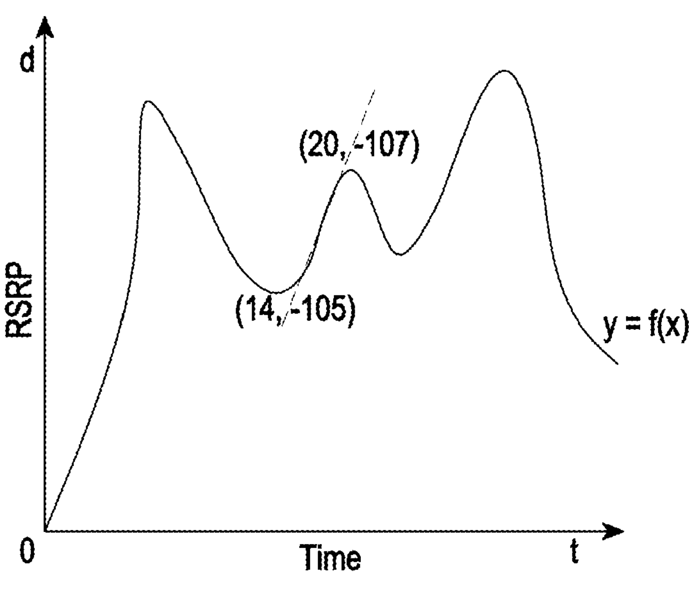
FIG. 7A is a graph illustrating signal strength value measurement of service cell to calculate instantaneous rate of change of time, according to various embodiments.
Figure 7B:
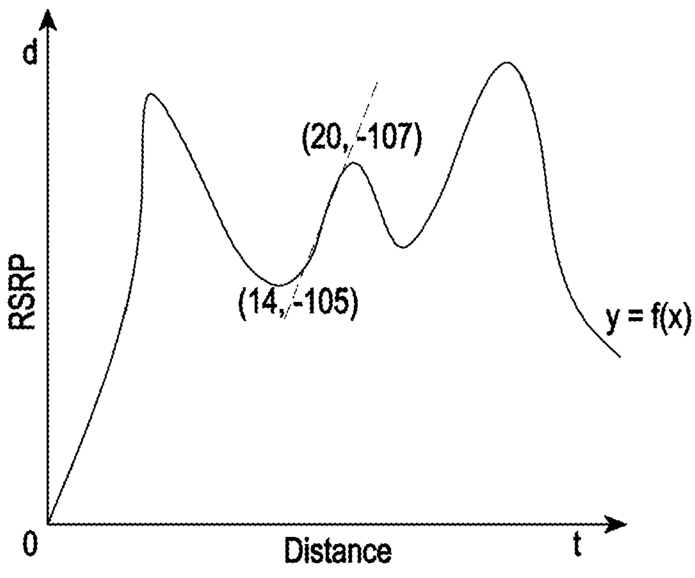
FIG. 7B is a graph illustrating signal strength value measurement of service cell to calculate instantaneous rate of change of distance, according to various embodiments.

FIG. 7A is a graph illustrating signal strength value measurement of service cell to calculate instantaneous rate of change of time, according to various embodiments. FIG. 7B is a graph illustrating signal strength value measurement of service cell to calculate instantaneous rate of change of distance, according to various embodiments. The UE (201) monitors the RSRP, RSRQ, SINR based of serving cell with sampling rate of 1.5 second to determine instantaneous ROC. To determine instantaneous ROC equation 2 may be used.

Equation (2)

$$\text{Instantaneous Rate of Change} = f'(t_0) = \lim_{(t_0\to t_1)} \frac{f(t_1)-f(t_0)}{t_1-t_0}$$

The UE (201) will keep checking instantaneous ROC at rate of Y sec when ROC rate going above 1.73 tangent at 60 degrees indicating drastic change in RSRP value with respect to time as shown in FIG. 7A. The UE (201) determines remaining time to measure serving cell with M1*N1 DRX cycle along with neighbor cell measurement, when required. The UE (201) determines the remaining time based on the DRX cycle, scaling factor, SMTC period and the like. The UE (201) identify rapid change in signal condition leading the UE (201) out of service before the expiry of the time-of-service timer. The rapid change is determined based on the direction of the NTN, distance and remaining time-of-serving cell coverage. The value of X and Y are decided based on perception.

When the UE (201) camped on the NTN cell (202) and time-of-service timer is started, the UE (201) checks whether the cell reselection criteria met that is, Srxlev greater than $S_{IntraSearchP}$ and Squal greater than $S_{IntraSearchQ}$, or Srxlev greater than $S_{nonIntraSearchP}$ and Squal greater than $S_{nonIntraSearchQ}$. When, the cell reselection criteria is met, then the UE (201) performs intra-frequency, inter-frequency or inter-RAT measurements to reselect to suitable cell. Otherwise, the UE (201) determines distance between the UE (201) and the serving cell reference location. The UE (201) determines whether distance-based criteria met. When the distance-based criteria are met then, the UE (201) perform intra-frequency, inter-frequency or inter-RAT measurements to reselect to suitable cell. When none of the criteria passes, UE (201) decides when the cell measurement needs to be initialized.

With disclosed solution the UE (201) determines rate of change (ROC) of signal condition with respect to time and distance to check whether signal condition of the UE (201) changing steadily or rapidly and based on elevation of ROC UE (201) will decide whether to perform measurement.

The disclosed solution determines gain in momentum to decide whether to start measurement for cell reselection. Along with time and distance, UE (201) also determines direction vector of the NTN and the information also taken into account while selecting suitable cell for cell reselection.

The ephemerisInfo in the NTN-configuration is part of SIB19 broadcast information to determine direction of the NTN cell (202) and UE (201) can determine direction based on GNSS/GPS/Location (or similar method) related data. The UE (201) performs optimized cell measurement for a smooth and enhanced 5G experience and improved battery life of UE (201). Equation 3 and 4 represents equation of tangent line or instantaneous ROC.

$$\text{Slope} = \frac{-105-(-107)}{20-14} = \frac{2}{3}$$

Equation of tangent line/Instantaneous ROC:

$$d-20 = \frac{3}{3}(t-14)$$

In an embodiment, the method for optimization of cell measurement in the NTN connection includes, camping to the cell in the NTN to receive the t-service timer from the NTN cell once the UE (201) is camped to the NTN cell. The ROC of the signal strength of the camped cell is determined in the NTN and determining whether the neighbor cell measurement criteria is met based on the parameters and the ROC of the signal strength of the camped NTN cell for performing one of initiating the neighbor cell measurement at the optimized time such that the cell reselection is completed before the expiry of t-service timer, when the neighbor cell measurement criterion is met. The communication is continued with the camped NTN cell, when the neighbor cell measurement criteria is met.

The parameters include ephemeris information of the camped NTN cell, the distance of the UE (201) from a NTN reference location on earth, and the duration of the t-service timer as received from the NTN cell (202). The neighbor cell measurement initiates neighbor cell measurement at the optimized time such that the cell reselection is completed before an expiry of t-service timer comprises determining whether remaining t-service time is less than a pre-defined threshold, a ROC criterion is met, a direction of the camped cell intersect with direction of the UE (201). The remaining duration of t-service timer is determined to identify whether the time is sufficient for the neighbor cell measurement and optimized time to initiate the measurement based on a Discontinuous Reception (DRX) cycle received from the camped cell, a scaling factor of the camped cell, and a SS/PBCH Block Measurement Timing Configuration (SMTC) period of the camped cell. The ROC of the signal strength is measured for a pre-defined time period to determine whether the average ROC of the signal strength is greater than a threshold value based on the measured ROC for the pre-defined time period, for performing the instantaneous ROC of the signal strength based on the determined average ROC of the signal strength or continuing the measurement of the ROC of the signal strength for the pre-defined time period, the instantaneous ROC of the signal strength is determined when the ROC of the RSRP value is constant within duration of the t-service timer. The measurement of the ROC of the signal strength is continued for the pre-defined time period, when the ROC of the RSRP value is constant within duration of the t-service timer. The neighbor cell measurement is performed by determining the direction of the UE (201), and optimized time to initiate the neighbor cell measurement based on the direction of the UE (201) and the trajectory of the NTN cell (202).

Figure 8:
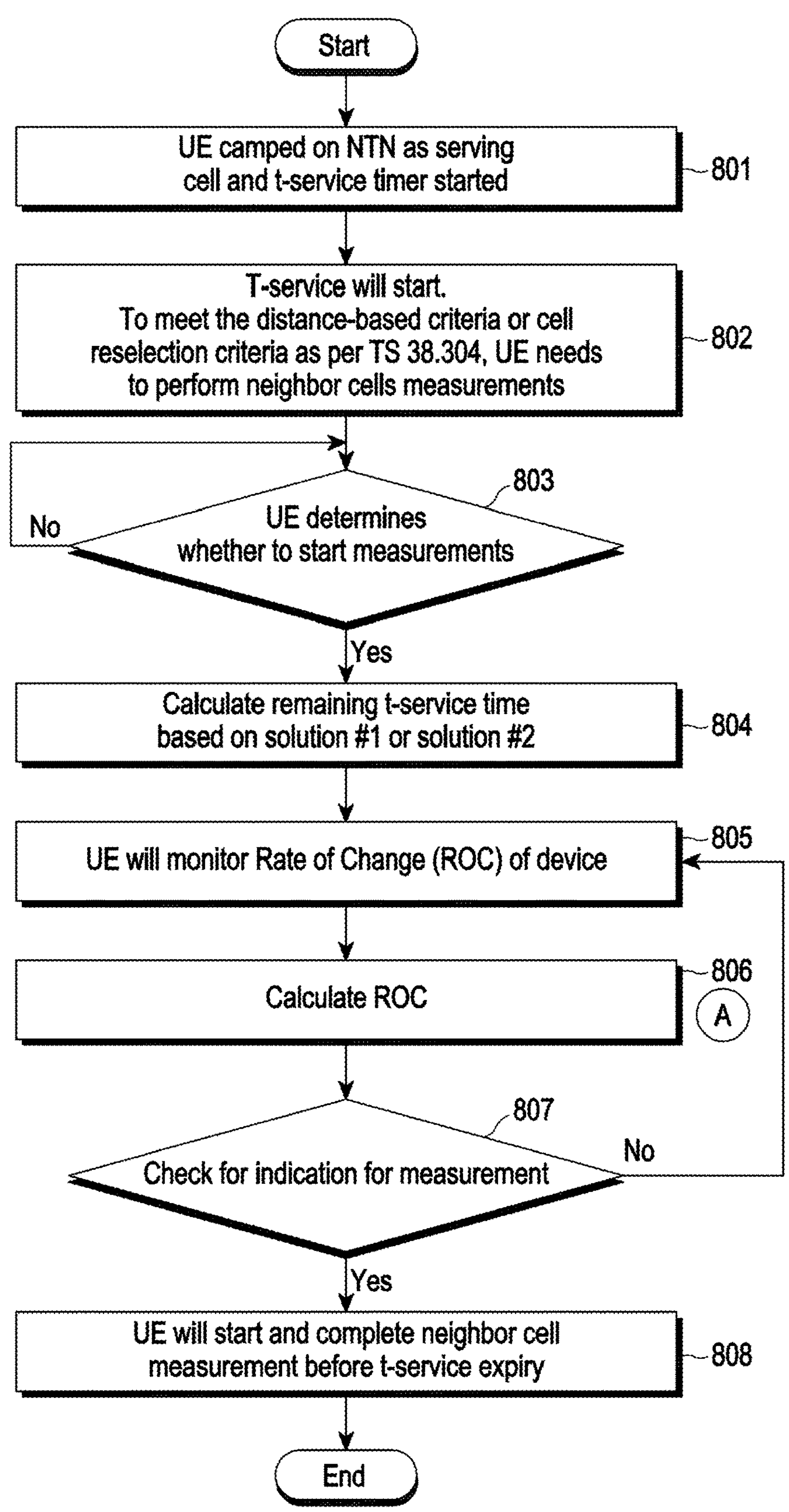
FIG. 8 is a flowchart illustrating an example method for optimized cell measurement while neighboring cell reselection to establish connection with NT or NTN network, according to various embodiments.

FIG. 8 is a flowchart illustrating an example method for optimized cell measurement while neighboring cell reselection to establish connection, according to various embodiments.

At 801, the UE (201) is camped on the NTN as serving cell and time-of-service timer is started. The serving cell refers to the NTN cell (202) connected to the UE (201).

At 802, the time-of-service timer is started, once the UE (201) is camped on the serving cell. To meet distance-based criteria or cell reselection criteria, the UE (201) needs to perform neighbor cell measurements.

At 803, the UE (201) determines whether to start the measurement. The measurement is the cell reselection measurement. The cell reselection allows the mobile devices to switch the connection from the current serving cell to a suitable neighboring ell. The cell reselection is performed to ensure that the mobile device stays connected to the best available cell.

At 804, remaining time-of-service time is determined based on a first solution and/or a second solution. The first solution is to determine the cell measurement optimization with respect to time. The second solution is to determine the cell measurement optimization with respect to the distance.

At 805, the UE (201) monitors the ROC of signal condition of the UE (201). The ROC condition refers to signal quality or strength of a communication link changes over time. In the wireless communication systems, the signal condition can change due to various factors such as distance from transmitter, obstacles in the propagation path, interference and environmental conditions.

Figure 9:
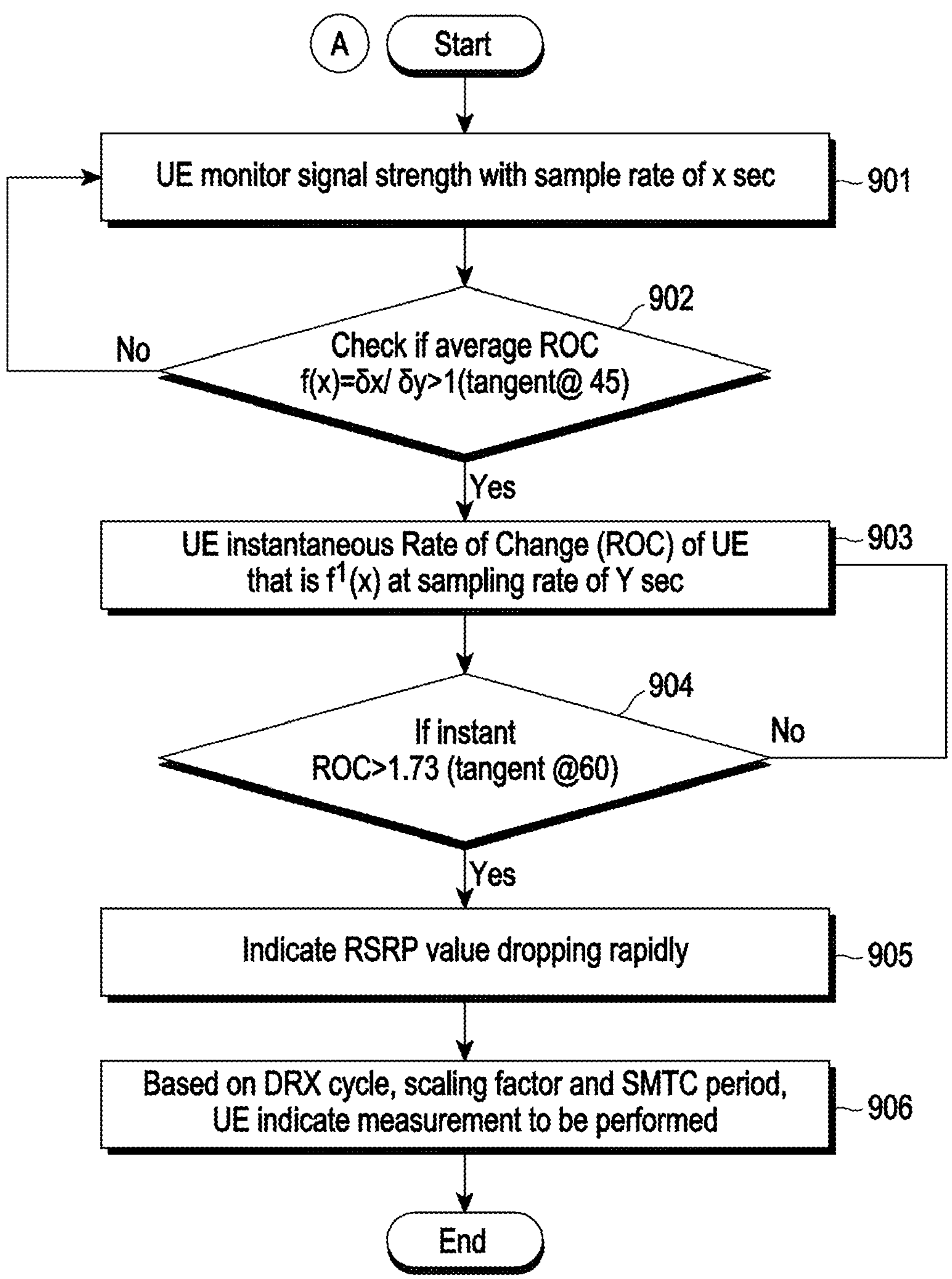
FIG. 9 is a flowchart illustrating Rate of Change (ROC) calculation for optimized cell measurement, according to various embodiments.

At 806, the ROC of the signal condition is determined based on the method disclosed in FIG. 9.

At 807, the indication for measurement is checked or determined. When the indication for measurement is received then 808 is performed, else the UE (201) monitors the ROC of the device again. The indication for the measurement is based on the time and distance criteria of the UE (201). One the optimized time or distance criteria is met, then the indication measurement is received to initiate the cell reselection measurement in the UE (201).

At 808, the UE (201) initiates and completes the neighbor cell measurement before the time-of-service expiry.

FIG. 9 is a flowchart illustrating Rate of Change (ROC) determination method for optimized cell measurement, according to various embodiments.

At 901, the UE (201) monitors signal strength with sample rate of x seconds. The x seconds can be a time interval for the UE (201) monitoring the signal strength.

At 902, The UE 201 determines whether the average ROC of the signal strength is greater than 1, e.g.:

$$f(x) = \delta x/\delta y > 1 \text{ (tangent at 45)}$$

At 903, the UE (201) determines the instantaneous ROC of the UE (201). The instantaneous ROC of the UE (201) can be $f^1$ (x) at sampling rate of Y seconds.

At 904, determines whether the instant ROC is greater than 1.73. That is tangent at 60. When the ROC is less than 1.73 (tangent at 60), then the 903 is performed to check for instantaneous ROC of UE (201), that is $f^1$ (x) at the sampling rate of Y seconds.

At 905, the RSRP value is indicated as rapidly dropping.

At 906, the scaling factor and SMTC period is determined based on the DRX cycle. The UE (201) indicates whether the cell measurement to be performed.

Figure 10:
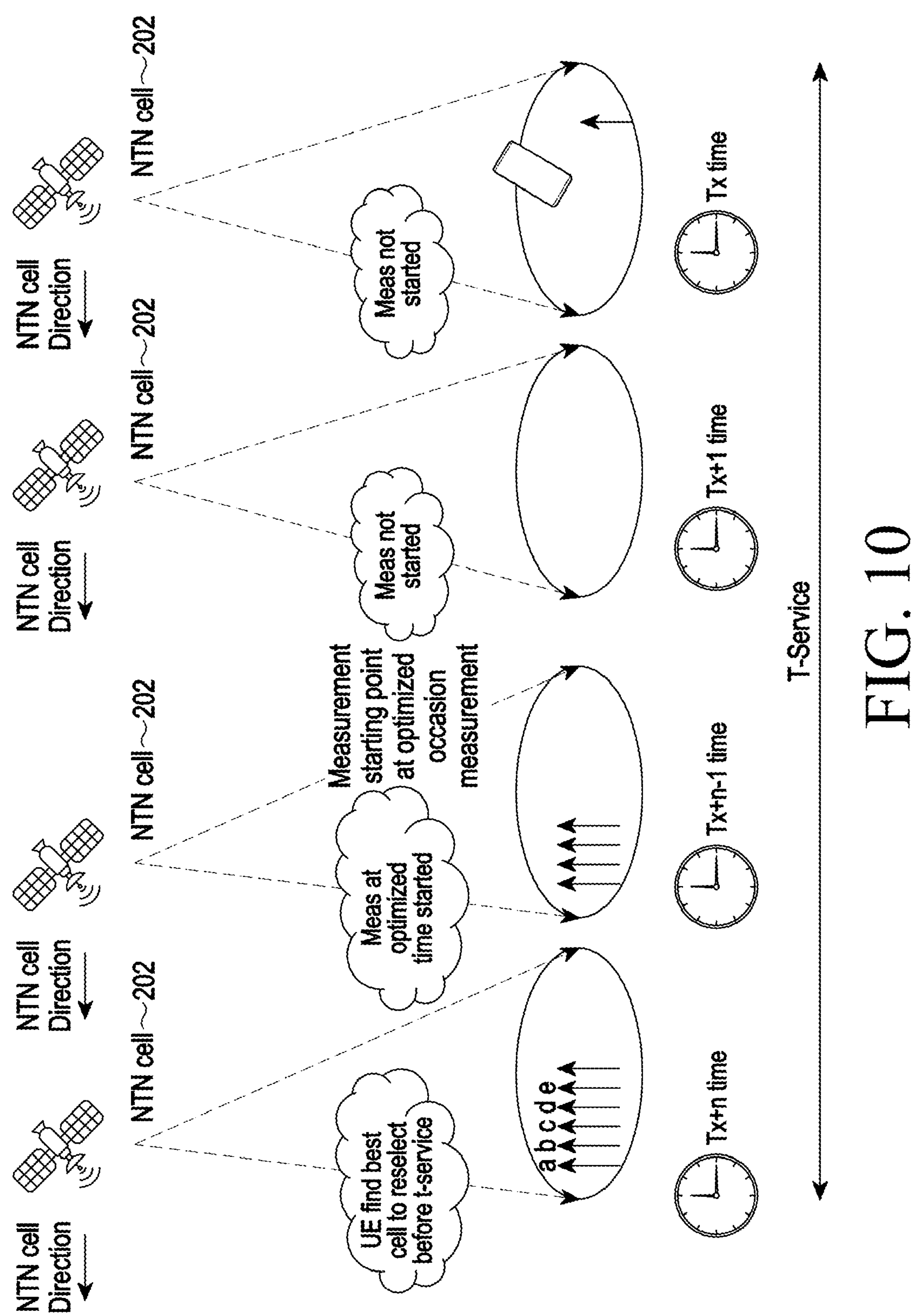
FIG. 10 is a diagram illustrating cell measurement at optimized time before t-service timer expiry, according to various embodiments.

FIG. 10 is a diagram illustrating cell measurement at optimized time before t-service, according to various embodiments. The diagram includes the NTN cell (202) and the UE (201). A direction of the NTN cell (202) is described with respect to the UE (201). The arrows (a, b, c, d, e, f, g, h . . . ) represent the periodic measurements performed by the UE (201) to evaluate neighbor cells for the cell reselection. The NTN cell (202) position is represented by time, Tx+n, Tx+n−1, Tx+1, Tx. The UE (201) initiates the cell measurement periodically at each measurement occasion at a, b, c, d, e, f, g, h . . . while the NTN cell (202) keeps moving with time Tx+n−1, Tx+1, Tx and so on. Once the UE (201) camped to the cell in the NTN, the time-of-service timer is started. The parameters are received from the camped cell. The parameters can include ephemeris information of the camped NTN cell, a distance covered by the camped cell, a duration of the time-of-service timer. The cell reselection criteria is determined based on the parameters received from the camped NTN cell. When the cell reselection criteria is met, the neighbor cell measurement is initiated before the expiry of the time-of-service and when the cell reselection criteria do not meet, the communication is continued with the camped NTN cell. The duration of the time-of-service timer is determined based on a Discontinuous Reception (DRX) cycle from the camped cell, a scaling factor of the camped cell, and a short message transmission cycle period of the camped cell. The UE (201) measures the ROC of the signal condition for a predefined time period. When the average ROC of the RSRP is greater than a threshold, the instantaneous ROC of the RSRP is determined based on the average ROC of the RSRP, and when the ROC of the RSRP value is exponentially degrading within the duration of the time-of-service timer, initiating the at least one neighbor cell measurement. When the average ROC of the RSRP is less than a threshold value, the measurement of the ROC of the RSRP is continued for the predefined time period. The threshold can be ROC rate going above 1.73 e.g., tangent at 60°. The neighbor cell measurements are initiated based on the direction of the UE (201) and by determining the optimized time to initiate the neighbor cell measurement based on the direction. The ephemeris information is received from the NTN to determine whether, the ephemeris information criteria is Srxlev>$S_{IntraSearchP}$ and Squal>$S_{IntraSearchQ}$, or Srxlev>$S_{nonIntraSearchP}$ and Squal>$S_{nonIntraSearchQ}$ The intra-frequency, inter-frequency and inter RAT measurement are initiated to reselect the cell, when the ephemerid information criteria is met. When the ephemeris information criteria is not met, the distance-based criteria is determined. The intra-frequency, inter-frequency, and inter RAT measurement is initiated for reselection of the cell, when the distance criteria is met. The intra-frequency, inter-frequency, and inter RAT measurement is initiated when the distance-based criteria is met, else the time-of-service timer criteria is determined.

In an embodiment, the cell reselection criteria can be distance-based criteria and time-based criteria.

In an embodiment, the RSRP may be interchangeably referred as signal strength or signal condition.

Figure 11:
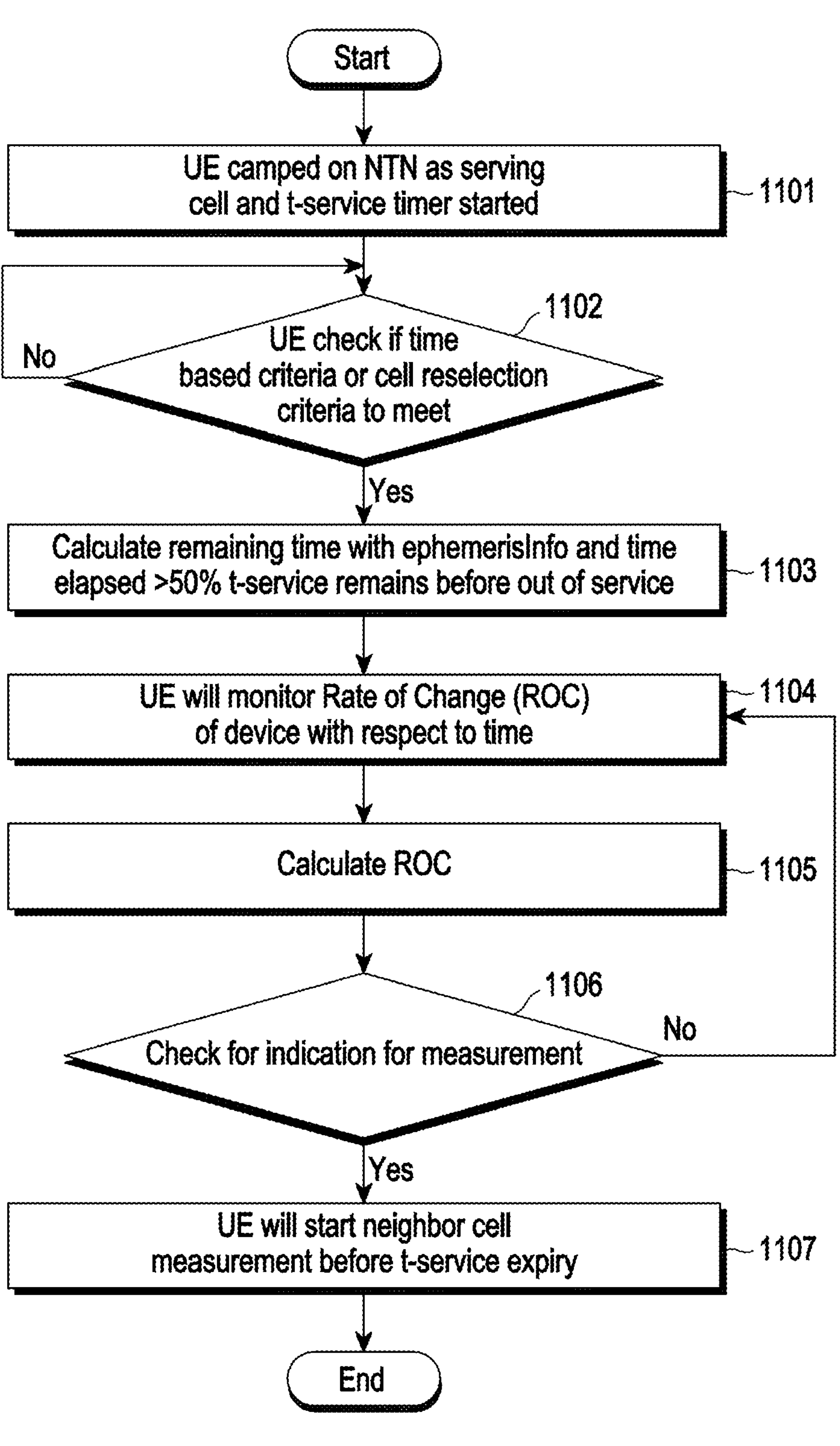
FIG. 11 is a flowchart illustrating cell measurement optimization with respect to time before t-service timer expiry for optimized cell measurement, according to various embodiments.

FIG. 11 is a flowchart illustrating example operations of cell measurement optimization with respect to time, according to various embodiments.

Pre-Conditions:

The UE (201) camped on the NTN cell (202). The UE (201) read sSIB19 and t-service timer has started.

Implementation:

The UE (201) checks distance between the UE (201) and the serving cell reference location e.g., UE (201) determines when distance based criteria met. When distance-based criteria met then the UE (201) perform intra-frequency, inter-frequency or inter-RAT measurements to reselect to suitable cell. The UE (201) can keep monitoring the criteria in background.

Regardless of distance-based criteria or cell reselection criteria, UE (201) can start monitor signal strength value of serving cell when the predefined threshold is has elapsed and direction of the NTN cell (202) based on ephemeris info received as part of NTN-configure in SIB19 intersects with the direction of the UE (201). The predefined threshold can be 50 percent of the t-service time.

The UE (201) monitors signal strength of device with respect to time and calculates ROC as per the disclosed method and the UE (201) checks when enough time remains to measure serving cell with M1*N1 DRX cycle formula along with neighbor cell measurement.

Based on above criteria, UE (201) decides when cell measurement for intra-frequency, inter-frequency or inter-RAT measurements are to be performed.

The disclosed solution makes sure that UE (201) reselects the network to better cell during rapid change in signal strength with respect to time or distance which might lead to device going into out of service before t-service time.

User experience is affected and the user can have a long battery life experience while camped on the NTN cell (202). In an embodiment, the optimization of the cell measurement in the NTN connection includes camping to the NTN cell (202) and receiving the t-service timer from the NTN cell (202) once the UE (201) is camped on the NTN cell (202). The neighbor cell measurement criterion is determined to imitate the neighbor cell measurement. To determine the criterion multiple parameters and ROC of signal strength of the camped NTN cell (202) are considered. The multiple parameters can be ephemeris information of the camped cell, a distance of the UE (201) from NTN reference location on earth, and a duration of the t-service timer as received from the NTN cell (202). The neighbor cell measurement at the optimized time is initialized such that the cell reselection is completed before an expiry of t-service timer based on the cell measurement criterion. The optimized time before the expiry of t-service timer includes determining the direction of the UE (201) and determining the optimized time to imitate the neighbor cell measurement based on the direction of the UE (201) and trajectory of the NTN cell (202). The optimized time is initiated such that the cell reselection is completed before the expiry of the t-service timer. The communication with the camped NTN cell (202) is continued when the neighbor cell measurement criterion is not met.

In an embodiment, the ROC of signal strength is measured for the pre-defined time period and determining whether the average ROC of the signal strength is greater than the threshold value based on the measured ROC for the pre-defined time period to determine instantaneous ROC of the signal strength based on the determined average ROC of the signal strength. The neighbor cell measurement is initiated when the ROC of the RSRP value is exponentially degrading within duration of the t-service timer. The measurement is continued for the ROC of the signal strength for the pre-defined time period when the ROC of the RSRP value is constant within duration of the t-service timer.

At 1101, the UE (201) is camped on the NTN as serving cell and t-service timer is initiated.

At 1102, the UE (201) determines whether distance-based criteria or cell reselection criteria is met. When the remaining time elapsed in more than the predefined threshold (for instance 50 percent) of the t-service time is lapsed and direction of the NTN cell (202) based on ephemeris information received as a part of NTN-configure in SIB19 is intersect with the direction of the UE (201).

At 1103, the UE (201) calculates remaining time with ephemerisInfo and time elapsed is greater than the predefined threshold (for instance 50 percent) t-service remains before out of service.

At 1104, the UE (201) monitors Rate of Change (ROC) of device with respect to time. The time is considered as the time of connection of the UE (201) with the NTN cell (202), time remaining for the UE (201) to be in connection with the NTN cell (202), and total time of connection of the UE (201) with the NTN cell (202). The ROC condition refers to signal quality or strength of a communication link changes over time. In the wireless communication systems, the signal condition can change due too various factors such as distance from transmitter, obstacles in the propagation path, interference and environmental conditions.

At 1105, the ROC is calculated based on the ROC method.

At 1106, the UE (201) checks whether enough time remains to measure serving cell with M1*N1 DRX cycle formula along with neighbor cell measurement. Based on the criteria the UE (201) decide whether cell measurement for intra-frequency, inter-frequency or inter-RAT measurements to be performed.

The disclosure makes sure that the UE (201) reselect a better cell during rapid change in signal strength with respect to time or distance which can lead to device going into out of service before t-service time. User experience is unaffected and user can have long battery life experience while camped on the NTN cell (202).

At 1107, once the condition is satisfied, the measurement can be the time at which the cell measurement is started, cell reselection criteria, distance between UE (201) and the serving cell reference location and the like.

Figure 12:
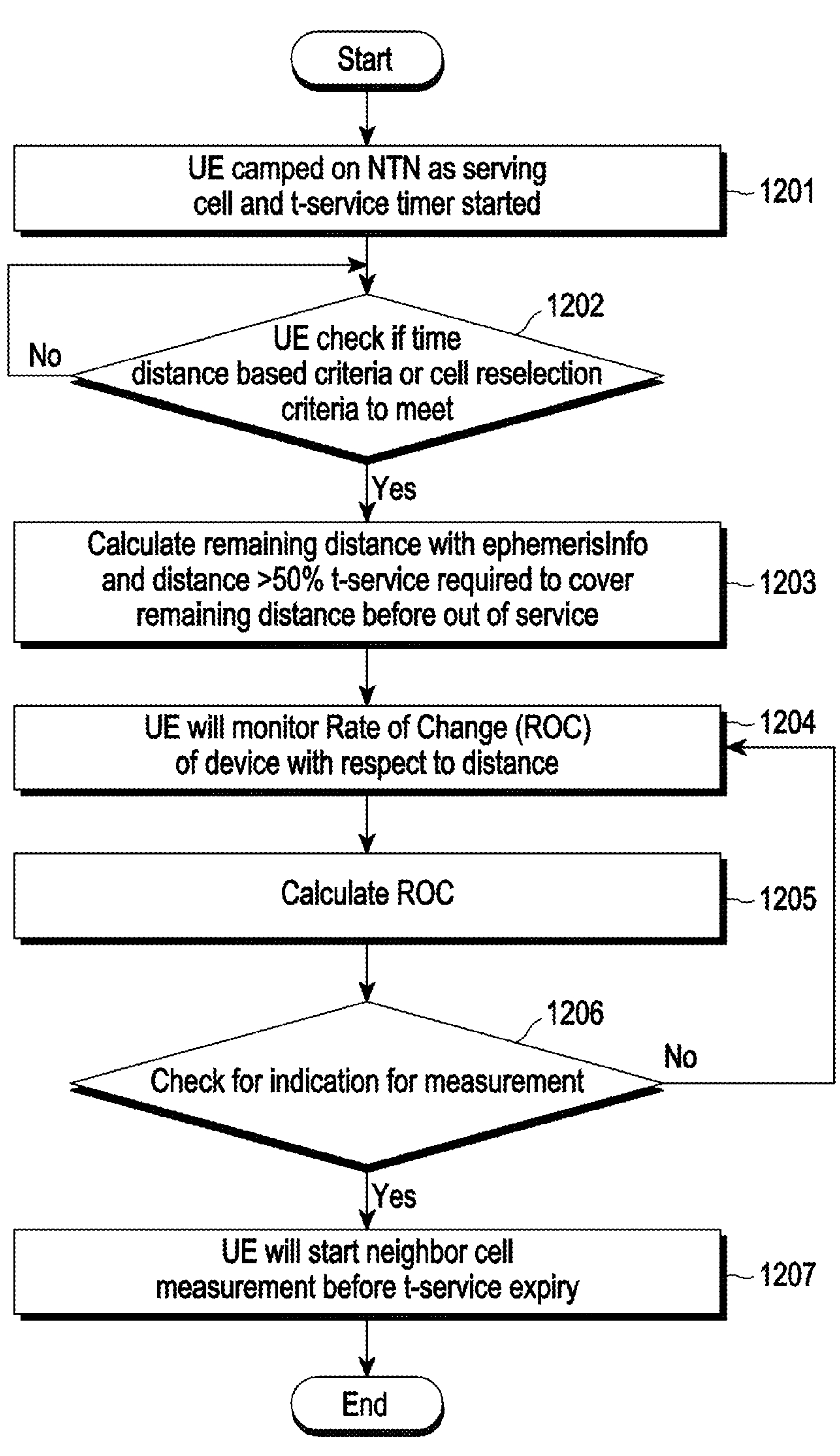
FIG. 12 is a flowchart illustrating cell measurement optimization with respect to distance before t-service timer expiry for optimized cell measurement, according to various embodiments.

FIG. 12 is a flowchart illustrating example cell measurement optimization with respect to distance before t-service timer expiry for optimized cell measurement, according to various embodiments.

At 1201, the UE (201) is camped on the NTN as serving cell and t-service timer is started.

At 1202, the UE (201) checks whether the distance-based criteria or cell reselection criteria is met.

At 1203, the UE (201) calculates remaining distance with ephemerisInfo and distance greater than the predefined threshold (such as 50 percent) of t-service required to cover remaining distance before out of service of the UE.

At 1204, the UE (201) monitors ROC of the device with respect to the distance. The UE (201) reselects the better cell due to rapid change in signal strength with respect to time that lead to device going into out of service than t-service time.

At 1205, the UE (201) calculates the ROC as per the disclosure. Based on above criteria, the UE (201) decide cell measurement for intra-frequency, inter-frequency or inter-RAT measurements to be performed.

At 1206, the UE (201) checks for indication of measurement, when distance-based criteria met then the UE (201) perform intra-frequency, inter-frequency or inter-RAT measurements to reselect to suitable cell. The UE monitors the criteria in background continuously. Regardless of distance-based criteria or cell reselection criteria, UE (201) initiate monitoring signal strength value of serving cell at 1207, when the predefined threshold of t-service time is elapsed and remaining distance is not enough to manage cell coverage additionally direction of the NTN cell (202) based on ephemeris info received as part of NTN-configure in SIB19 is intersect with the direction of UE (201).

The disclosure is highly beneficial for the UEs by optimizing cell reselection measurement while camped on the NTN cell (202) to improve battery performance. The disclosure reduces unnecessary measurement and resource utilization during the NTN cell (202) service. Further helps the UE (201) to remain in continuous service and avoid getting out of service in remote area by providing enhanced coverage experience.

Figure 13:
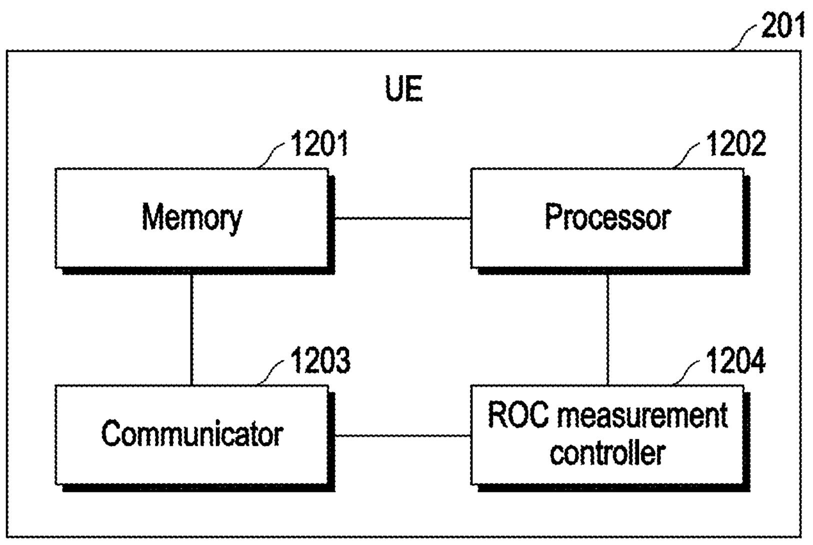
FIG. 13 is a block diagram illustrating an example configuration of the UE for optimized cell measurement, according to various embodiments.

FIG. 13 is a block diagram illustrating an example configuration of the UE (201) for optimized cell measurement, according to various embodiments.

The UE (201) can be but not limited to a laptop, a palmtop, a desktop, a mobile phone, a smart phone, Personal Digital Assistant (PDA), a tablet, a wearable device, an Internet of Things (IoT) device, a virtual reality device, a television, a connected car, a foldable device, a flexible device, a display device and an immersive system.

In an embodiment, the UE (201) includes a memory (1201), at least one processor (e.g., including processing circuitry) (1202), a communicator (e.g., including communication circuitry) (1203), and a ROC measurement controller (e.g., including circuitry) (1204).

The memory (1201) is configured to store instructions to be executed by the at least one processor (1202). The memory (1201) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (1201) may, in some examples, be considered a non-transitory storage medium. The term "non-transitory" may indicate that the storage medium is not embodied in a carrier wave or a propagated signal. However, the term "non-transitory" should not be interpreted that the memory (1201) is non-movable. In some examples, the memory (1201) is configured to store larger amounts of information. In certain examples, a non-transitory storage medium may store data that can, over time, change (e.g., in Random Access Memory (RAM) or cache).

The at least one processor (1202) may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The at least one processor (1202) may include multiple cores and is configured to execute the instructions stored in the memory (1201). When the at least one processor (1202) execute the instructions stored in the memory (1201) the at least one processor (1202) may cause the UE (201) to perform operations described herein.

the communicator (1203) may include various communication circuitry including, for example, an electronic circuit specific to a standard that enables wired or wireless communication. The communicator (1203) is configured to communicate internally between internal hardware components such as for example the memory (1201), the at least one processor (1202), the ROC measurement controller (1204) and with external devices via one or more networks.

The ROC measurement controller (1204) may include various circuitry and/or executable program instructions and determines the ROC of the signal strength of the camped NTN cell. Further, determining whether the neighbor cell measurement criterion is met based on the parameters and the ROC of the signal strength of the camped NTN cell to perform initiating neighbor cell measurement at the optimized time such that the cell reselection is completed before an expiry of t-service timer, when the neighbor cell measurement criterion is met and continuing communication with the camped NTN cell when the neighbor cell measurement criteria is not met. The ROC measurement controller (1204) may be a part of the at least one processor (1202).

According to the 3GPP specification, the NTN cell UE initiates measurement only when it fulfils the existing measurement criteria along with distance-based rules. Similarly, the UE performs measurement (intra/inter-frequency & inter-RAT) based on the t-service, which may refer, for example, to when the cell is going to stop serving the current coverage. The exact time to start the measurement before the t-service is up to the implementation of the UE. Essentially, when the t-service is configured, a UE camped on the NTN cell will begin the measurement based on its implementation so that the UE does not lose service.

However, there are several factors due to which the UE may need to start the measurement earlier to avoid the loss of service or discontinues service due to coverage loss and discover a better cell to switch to before the current serving cell coverage stops. Currently, there are chances that the UE may not find a proper neighbor cell to switch based on the measurement rule, resulting in a poor user experience on the NTN cell.

To address this issue, the disclosure involves ROC measurement controller (1204) for monitoring the rate change of RSRP with respect to time as well as the remaining t-service time of the serving cell. If the RSRP value is rapidly degrading, and there is enough t-service time left, the UE initiates the measurement of the neighboring cell for intra/inter-frequency and inter-RAT measurement to find a suitable cell. This will enable the ROC measurement controller (1204) to acquire the service without waiting for the t-service timer to expire, resulting in a loss of service, followed by the additional wait for the measurement to start to camp on the proper cell.

According to embodiments of the disclosure, the UE will be able to find a suitable cell beforehand, avoiding service loss and providing a good user experience.

The disclosure offers a distinct advantage to the UE over competitors by significantly reducing power consumption while camped on NTN cell1. It achieves this by optimizing cell measurement timing through the use of time distance and ephemeris information, resulting in improved cell reselection. Furthermore, the disclosure provides extended battery life to users, allowing for uninterrupted connectivity support and efficient resource utilization. In summary, the disclosure enhances measurement resource utilization and overall battery performance for the UEs operating in the 5G arena or other wireless networks.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for cell measurement by a user equipment (UE) in a non-terrestrial network (NTN) communication system, comprising:

camping on an NTN cell;

receiving at least one parameter from the camped NTN cell;

determining a rate of change (ROC) of signal strength of the camped NTN cell;

determining whether a neighbor cell measurement criterion is met based on determining whether remaining time of the service for the NTN cell is less than a specified threshold, and whether a ROC criterion is met; and initiating measurement for at least one neighbor cell, when the neighbor cell measurement criterion is met.

2. The method of claim 1, further comprising:

starting a timer related to a service of the NTN cell based on camping to the NTN cell, wherein the measurement for at least one neighbor cell is initiated at a time for completing a cell reselection before an expiry of the timer.

3. The method of claim 2, wherein determining whether the neighbor cell measurement criterion is met is further based on a direction of the camped NTN cell intersects with direction of the UE.

4. The method of claim 2, further comprising:

determining whether a remaining duration of the timer is sufficient for subsequent neighbor cell measurement and a time to start measurement based on a discontinuous reception (DRX) cycle received from the camped NTN cell, a scaling factor of the camped NTN cell, and a SS/PBCH block measurement timing configuration (SMTC) period of the camped NTN cell.

5. The method of claim 2, further comprising:

measuring the ROC of the signal strength for a specified time period;

determining whether an average ROC of the signal strength is greater than a threshold value based on the measured ROC for the specified time period; and performing one of:

determining an instantaneous ROC of the signal strength based on the average ROC of the signal strength, and based on the ROC of a reference signal received power (RSRP) value exponentially degrading within duration of the timer, initiating the at least one neighbor cell measurement; or continuing the measurement of the ROC of the signal strength for a specified time period, based on the ROC of the RSRP value being constant within duration of the timer.

6. The method of claim 1, further comprising:

continuing communication with the camped NTN cell, when the neighbor cell measurement criterion is not met.

7. The method of claim 1, wherein the at least one parameter comprises at least one of an ephemeris information of the camped NTN cell, a distance of the UE from an NTN reference location on earth, or a duration of a t-service timer received from NTN cell.

8. The method of claim 1, wherein initiating the measurement for the at least one neighbor cell, comprises, determining a direction of the UE; and determining a time to initiate the measurement for the at least one neighbor cell based on the direction of the UE and a trajectory of the NTN cell.

9. The method of claim 8, wherein initiating the neighbor cell measurement comprises initiating a measurement at the time such that a cell reselection is completed before the expiry of the t-service timer.

10. The method of claim 8, wherein determining the time to initiate the measurement for the at least one neighbor cell, comprises:

initiating at least any one of intra-frequency, inter-frequency, and inter radio access technology (RAT) measurement to reselect a cell, when a neighbor cell measurement criteria is met; and determining the ROC of the signal strength of the camped NTN cell to initiate the at least one neighbor cell measurement, based on ROC criteria being met or a remaining t-service timer being less than the specified threshold.

11. A user equipment (UE) for cell measurement in a non-terrestrial network (NTN) communication system, the UE comprising:

memory storing instructions;

at least one processor, wherein the instructions, when executed by the at least one processor, cause the UE to perform operations, the operations comprising:

camping on an NTN cell;

receiving at least one parameter from the camped NTN cell;

determining a rate of change (ROC) of signal strength of the camped NTN cell;

determining whether a neighbor cell measurement criterion is met based on determining whether remaining time of the service for the NTN cell is less than a specified threshold, and whether a ROC criterion is met; and initiating measurement for at least one neighbor cell when the neighbor cell measurement criterion is met.

12. The UE of claim 11, wherein the operations further comprise:

starting a timer related to a service of the NTN cell based on camping to the NTN cell, wherein the measurement for at least one neighbor cell is initiated at a time for completing a cell reselection before an expiry of the timer.

13. The UE of claim 12, wherein determining whether the neighbor cell measurement criterion is met is further based on determining whether determining whether a direction of the camped NTN cell intersecting with direction of the UE.

14. The UE of claim 12, wherein the operations further comprise:

determining whether a remaining duration of the timer is sufficient for subsequent neighbor cell measurement and a time to start measurement based on a discontinuous reception (DRX) cycle received from the camped NTN cell, a scaling factor of the camped NTN cell, and a SS/PBCH block measurement timing configuration (SMTC) period of the camped NTN cell.

15. The UE of claim 12, wherein the operations further comprise:

measuring the ROC of the signal strength for a specified time period;

determining whether an average ROC of the signal strength is greater than a threshold value based on the measured ROC for the specified time period; and perform one of:

determining an instantaneous ROC of the signal strength based on the average ROC of the signal strength, and based on the ROC of RSRP value exponentially degrading within duration of the timer, initiating the neighbor cell measurement; or continue the measurement of the ROC of the signal strength for a specified time period, based on the ROC of the RSRP value being constant within duration of the timer.

16. The UE of claim 11, wherein the operations further comprise:

continuing communication with the camped NTN cell, when the neighbor cell measurement criterion is not met.

17. The UE of claim 11, wherein the at least one parameter comprises at least one of an ephemeris information of the camped NTN cell, a distance of the UE from NTN reference location on earth, or a duration of a t-service timer as received from NTN cell.

18. The UE of claim 11, wherein initiating the measurement for the at least one neighbor cell comprises, determining a direction of the UE; and determining a time to initiate the measurement for the at least one neighbor cell based on the direction of the UE and trajectory of the NTN cell.

19. The UE of claim 18, wherein determining the time to initiate the measurement for the at least one neighbor cell comprises:

initiating at least any one of intra-frequency, inter-frequency, and inter radio access technology (RAT) measurement to reselect a cell, when a neighbor cell measurement criteria is met; and determining the ROC of the signal strength of the camped cell to initiate the neighbor cell measurement, based on an ROC criterion being met or the remaining t-service timer being less than the specified threshold.

20. A non-transitory computer-readable storage medium storing instructions which, when executed by at least one processor of a user equipment (UE) cause the UE to perform operations, the operations comprising:

camping on a non-terrestrial network (NTN) cell;

receiving at least one parameter from the camped NTN cell;

determining a rate of change (ROC) of signal strength of the camped NTN cell;

determining whether a neighbor cell measurement criterion is met based on determining whether remaining time of the service for the NTN cell is less than a specified threshold, and whether a ROC criterion is met; and initiating measurement for at least one neighbor cell based on the neighbor cell measurement criterion being met.

* * * * *